United States Patent
Cheng et al.

(10) Patent No.: US 12,199,778 B2
(45) Date of Patent: Jan. 14, 2025

(54) METHOD AND APPARATUS FOR DOWNLINK TRANSMISSION IN NTN

(71) Applicant: SHARP KABUSHIKI KAISHA, Sakai (JP)

(72) Inventors: Chien-Chun Cheng, Taipei (TW); Chia-Hao Yu, Taipei (TW); Chia-Hung Wei, Taipei (TW); Yu-Hsin Cheng, Taipei (TW); Hung-Chen Chen, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 277 days.

(21) Appl. No.: 17/626,646

(22) PCT Filed: Jul. 29, 2020

(86) PCT No.: PCT/CN2020/105625
§ 371 (c)(1),
(2) Date: Jan. 12, 2022

(87) PCT Pub. No.: WO2021/018221
PCT Pub. Date: Feb. 4, 2021

(65) Prior Publication Data
US 2022/0239417 A1    Jul. 28, 2022

Related U.S. Application Data

(60) Provisional application No. 62/888,023, filed on Aug. 16, 2019, provisional application No. 62/881,586, filed on Aug. 1, 2019.

(51) Int. Cl.
*H04L 1/1822* (2023.01)
*H04B 7/06* (2006.01)
(Continued)

(52) U.S. Cl.
CPC .......... *H04L 1/1822* (2013.01); *H04L 1/1835* (2013.01); *H04L 1/1896* (2013.01); *H04B 7/0632* (2013.01)

(58) Field of Classification Search
CPC ... H04L 1/1822; H04L 1/1835; H04L 1/1896; H04B 7/0632
See application file for complete search history.

(56) References Cited

U.S. PATENT DOCUMENTS

2018/0092073 A1    3/2018    Nogami et al.

FOREIGN PATENT DOCUMENTS

| CN | 105790897 A | 7/2016 |
|---|---|---|
| CN | 106537979 A | 3/2017 |

OTHER PUBLICATIONS

SONY: "Discussion on HARQ process number", 3GPP Draft; R1-1703136, 3rd Generation Partnership Project (3GPP), vol. RAN WG1, no. Athens, Greece; Feb. 13, 2017-Feb. 17, 2017, Feb. 12, 2017 (Feb. 12, 2017) (Year: 2017).*

(Continued)

*Primary Examiner* — Benjamin H Elliott, IV
*Assistant Examiner* — Yewon Kim
(74) *Attorney, Agent, or Firm* — ScienBiziP, P.C.

(57) ABSTRACT

A user equipment (UE) and a method for wireless communication are provided. The method includes: receiving a radio resource control (RRC) configuration from a base station (BS); determining whether a first parameter is configured in the RRC configuration; receiving first downlink control information (DCI) from the BS, the first DCI including a first field indicating a first Hybrid Automatic Repeat Request (HARD) process identifier (ID); determining that a number of bits in the first field is a default number in a case that the first parameter is not configured in the RRC configuration; and determining that the number of bits in the (Continued)

first field is a specific number greater than the default number in a case that the first parameter is configured in the RRC configuration.

16 Claims, 6 Drawing Sheets

(51) Int. Cl.
  *H04L 1/1829* (2023.01)
  *H04L 1/1867* (2023.01)

(56) References Cited

OTHER PUBLICATIONS

Nokia et al: "On PDCCH Enhancements for NR URLLC", 3GPP Draft; R1-1906751_NOKIA_EURLLC PDCCH ENH, 3rd Generation Partnership Project (3GPP), vol. RAN WG1, no. Reno, Nevada, US; May 13, 2019-May 17, 2019, May 13, 2019(May 13, 2019) (Year: 2019).*
Panasonic: "Discussion on Retransmisson Mechanisms for NTN", 3GPP Draft; R1-1906265 NTN HARQ, 3rd Generation Partnership Project (3GPP), vol. RAN WG1, no. Reno, USA; May 13, 2019-May 17, 2019, May 13, 2019(May 13, 2019) (Year: 2019).*
MediaTek Inc.: "Summary for more delay-tolerant re-transmission mechanisms in NR-NTN", 3GPP; R1-1907757, 3GPP, RAN WG1, Reno, USA, May 2019 (Year: 2019).*
Ericsson: "Chairman's notes of AI 7.2.5 Study on solutions for NR to support Non-Terrestrial Network (NTN)", 3GPP; R1-1907847, 3GPP, RAN WG1, Reno, USA, May 2019 (Year: 2019).*
3GPP TS 38.214, "3rd Generation Partnership Project; Technical Specification Group Radio Access Network; NR; Physical layer procedures for data (Release 15)", V15.5.0 (Mar. 2019).
3GPP TS 38.331, "3rd Generation Partnership Project; Technical Specification Group Radio Access Network; NR; Radio Resource Control (RRC) protocol specification (Release 15)", V15.5.0 (Mar. 2019).
3GPP TS 38.211, "3rd Generation Partnership Project; Technical Specification Group Radio Access Network; NR; Physical channels and modulation (Release 15)", V15.5.0 (Mar. 2019).
3GPP TS 38.212, "3rd Generation Partnership Project; Technical Specification Group Radio Access Network; NR; Multiplexing and channel coding (Release 15)", V15.5.0 (Mar. 2019).
3GPP TS 38.101-1, "3rd Generation Partnership Project; Technical Specification Group Radio Access Network; NR; User Equipment (UE) radio transmission and reception; Part 1: Range 1 Standalone (Release 15)", V15.5.0 (Mar. 2019).
Sony: "Discussion on HARQ process number", 3GPP Draft; R1-1703136, 3rd Generation Partnership Project (3GPP), Mobile Competence Centre; 650, Route Des Lucioles; F-06921 Sophia-Antipolis Cedex; France, vol. RAN WG1, no. Athens, Greece; Feb. 13. 2017-Feb. 17, 2017, Feb. 12, 2017 (Feb. 12, 2017), XP051210273, [retrieved on Feb. 12, 2017], p. 2.
Nokia et al: "On PDCCH Enhancements for NR URLLC", 3GPP Draft; R1-1906751_NOKIA_EURLLC PDCCH ENH, 3rd Generation Partnership Project (3GPP), Mobile Competence Centre; 650, Route Des Lucioles; F-06921 Sophia-Antipolis Cedex; France vol. RAN WG1, no. Reno, Nevada, US; May 13, 2019-May 17, 2019, May 13, 2019(May 13, 2019), XP051728202, [retrieved on May 13, 2019], p. 6-p. 7.
Panasonic: "Discussion on Retransmisson Mechanisms for NTN", 3GPP Draft; R1-1906265 NTN HARQ, 3rd Generation Partnership Project (3GPP), Mobile Competence Centre; 650, Route Des Lucioles; F-06921 Sophia-Antipolis Cedex; France vol. RAN WG1, no. Reno, USA; May 13, 2019-May 17, 2019, May 13, 2019(May 13, 2019), XP051727718, [retrieved on May 13, 2019], p. 2-p. 3.
Mediatek Inc., "Delay-tolerant re-transmission mechanisms in NR-NTN Document for: Discussion and Decision", R1-1906466 3GPP TSG RAN WG1 Meeting #97, Reno, Nevada, USA, May 13-17, 2019.
Huawei et al., "Discussion on random access procedure for NTN", R1-1813661 3GPP TSG RAN WG1 Meeting #95, Spokane, USA, Nov. 12-16, 2018.

* cited by examiner

400

500

METHOD AND APPARATUS FOR DOWNLINK TRANSMISSION IN NTN

CROSS-REFERENCE TO RELATED APPLICATION(S)

This application is a national stage application, filed under 35 U.S.C. § 371, of International Patent Application No. PCT/CN2020/105625, filed on Jul. 29, 2020, which claims the benefit of and priority to U.S. Provisional Patent Application Ser. No. 62/881,586, filed on Aug. 1, 2019, entitled "HARQ-Dependency Control for Enhanced AMC for NTN" and U.S. Provisional Patent Application Ser. No. 62/888,023, filed on Aug. 16, 2019, entitled "HARQ Enhancement and Soft Buffer Management for NTN". The contents of all above-named applications are fully incorporated herein by reference for all purposes.

FIELD

The present disclosure is related to wireless communication, and more particularly, to a method for downlink transmission in cellular wireless communication networks.

BACKGROUND

With the tremendous growth in the number of connected devices and the rapid increase in user/network traffic volume, various efforts have been made to improve different aspects of wireless communication for cellular wireless communication systems, such as fifth generation (5G) New Radio (NR), by improving data rate, latency, reliability and mobility.

The 5GNR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there exists a need for further improvements in the art.

SUMMARY

The present disclosure is directed to a method for downlink transmission in cellular wireless communication networks.

In a first aspect of the present disclosure, a method for wireless communication performed by a user equipment (UE) is provided. The method includes: receiving a radio resource control (RRC) configuration from a base station (BS); determining whether a first parameter is configured in the RRC configuration; receiving first downlink control information (DCI) from the BS, the first DCI including a first field indicating a first Hybrid Automatic Repeat Request (HARQ) process identifier (ID); determining that a number of bits in the first field is a default number in a case that the first parameter is not configured in the RRC configuration; and determining that the number of bits in the first field is a specific number greater than the default number in a case that the first parameter is configured in the RRC configuration.

In an implementation of the first aspect, the specific number is 5.

In another implementation of the first aspect, the first DCI is one of a DCI format 0_1 and a DCI format 1_1.

In another implementation of the first aspect, the first DCI is a DCI format 0_1. The method further includes: determining whether a second parameter is configured in the RRC configuration; receiving second DCI having a DCI format 1_1 from the BS, the second DCI including a second field indicating a second HARQ process ID; determining that a number of bits in the second field is the default number in a case that the second parameter is not configured in the RRC configuration; and determining that the number of bits in the second field is the specific number in a case that the second parameter is configured in the RRC configuration.

Another implementation of the first aspect further comprises receiving, from the BS, a command that indicates disabling a HARQ feedback for a specific HARQ process.

Another implementation of the first aspect further comprises receiving, from the BS, a first Physical Downlink Shared Channel (PDSCH) associated with the specific HARQ process; and receiving, from the BS, a second PDSCH associated with the specific HARQ process before an end of an expected transmission of the HARQ feedback for the specific HARQ process, the second PDSCH including a retransmission of a Transport Block (TB) transmitted in the first PDSCH.

In another implementation of the first aspect, the command is received via an RRC message.

In another implementation of the first aspect, the RRC message indicates an ID of the specific HARQ process.

Another implementation of the first aspect further comprises receiving, from the BS, a Channel State Information (CSI) report configuration that includes a second parameter for indicating a polarization mode.

Another implementation of the first aspect further comprises determining a Channel Quality Indicator (CQI) based on the CSI report configuration. The CQI has different values depending on a value of the second parameter.

In a second aspect of the present disclosure, a UE is provided that includes one or more non-transitory computer-readable media containing computer-executable instructions embodied therein and at least one processor coupled to the one or more non-transitory computer-readable media. The at least one processor is configured to execute the computer-executable instructions to: receive an RRC configuration from a BS; determine whether a first parameter is configured in the RRC configuration; receive first DCI from the BS, the first DCI including a first field indicating a first HARQ process ID; determine that a number of bits in the first field is a default number in a case that the first parameter is not configured in the RRC configuration; and determine that the number of bits in the first field is a specific number greater than the default number in a case that the first parameter is configured in the RRC configuration.

BRIEF DESCRIPTION OF THE DRAWINGS

Aspects of the present disclosure are best understood from the following detailed description when read with the accompanying drawings. Various features are not drawn to scale. Dimensions of various features may be arbitrarily increased or reduced for clarity of discussion.

DETAILED DESCRIPTION

Figure 1:
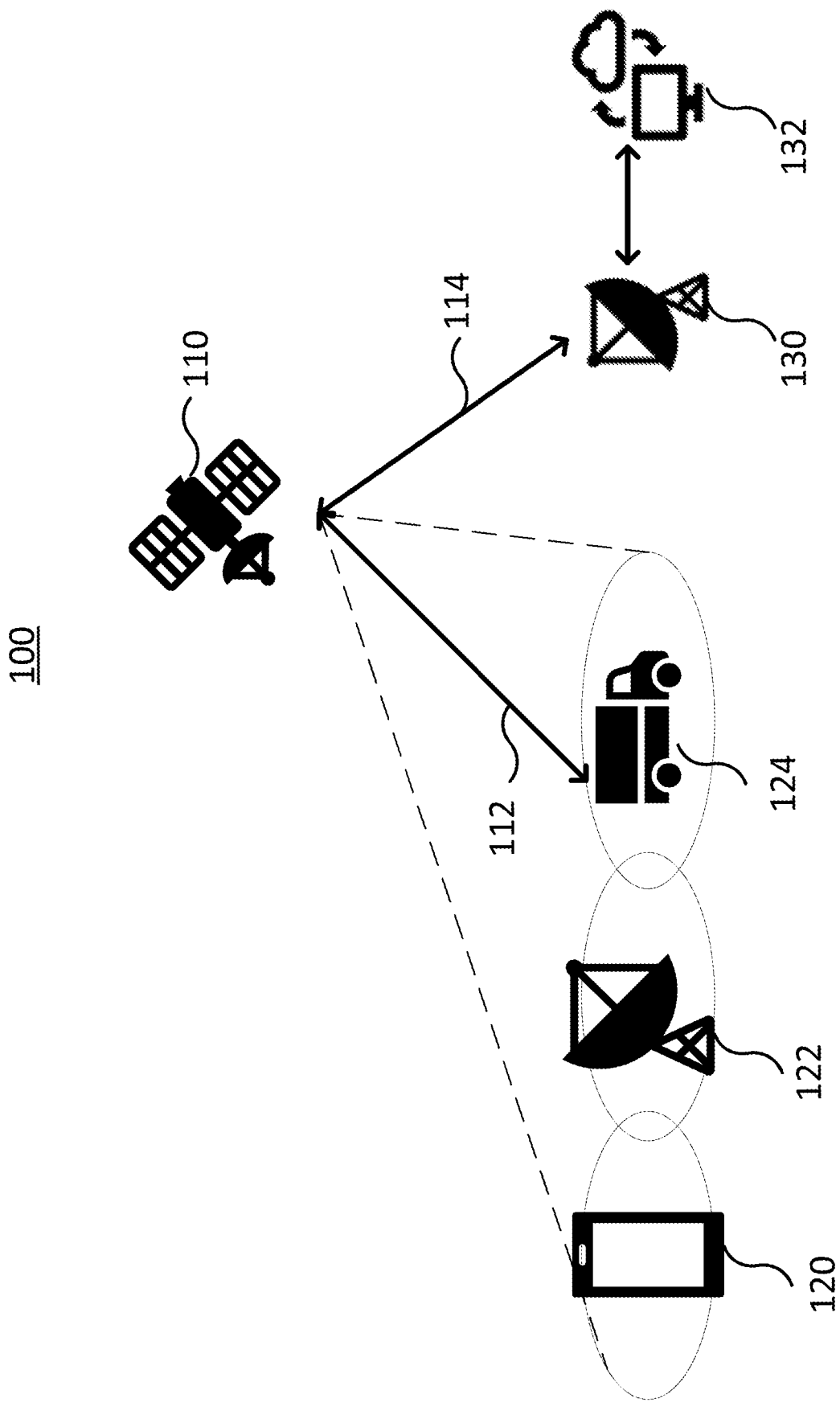
FIG. 1 includes a diagram illustrating an example regenerative LEO satellite network according to an example implementation of the present disclosure.

The following description contains specific information related to implementations of the present disclosure. The drawings and their accompanying detailed description are merely directed to implementations.

However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the drawings. However, the features in different implementations may be different in other respects and shall not be narrowly confined to what is shown in the drawings.

The phrases "in one implementation," or "in some implementations," may each refer to one or more of the same or different implementations. The term "coupled" is defined as connected whether directly or indirectly through intervening components and is not necessarily limited to physical connections. The term "comprising" means "including, but not necessarily limited to" and specifically indicates open-ended inclusion or membership in the so-described combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for describing associated objects and represents that multiple relationships may exist such that A and/or B may indicate that A exists alone, A and B exist at the same time, or B exists alone. The character "/" generally represents that the associated objects are in an "or" relationship.

For the purposes of explanation and non-limitation, specific details such as functional entities, techniques, protocols, and standards are set forth for providing an understanding of the present disclosure. In other examples, detailed description of well-known methods, technologies, systems, and architectures are omitted so as not to obscure the description with unnecessary details.

Persons skilled in the art will recognize that any network function(s) or algorithm(s) disclosed may be implemented by hardware, software or a combination of software and hardware. Disclosed functions may correspond to modules which may be software, hardware, firmware, or any combination thereof.

A software implementation may include computer executable instructions stored on a computer readable medium such as memory or other type of storage devices. One or more microprocessors or general-purpose computers with communication processing capability may be programmed with corresponding executable instructions and perform the disclosed network function(s) or algorithm(s).

The microprocessors or general-purpose computers may include Application-Specific Integrated Circuitry (ASIC), programmable logic arrays, and/or using one or more Digital Signal Processor (DSPs). Although some of the present disclosure is directed to software installed and executing on computer hardware, alternative implementations as firmware or as hardware or combination of hardware and software are well within the scope of the present disclosure. The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long Term Evolution (LTE) system, an LTE-Advanced (LTE-A) system, an LTE-Advanced Pro system, or a 5G NR Radio Access Network (RAN) typically includes at least one base station (B S), at least one UE, and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more BSs.

A UE may include but is not limited to a mobile station, a mobile terminal or device, or a user communication radio terminal. The UE may be portable radio equipment that includes but is not limited to a mobile phone, a tablet, a wearable device, a sensor, a vehicle, or a Personal Digital Assistant (PDA) with wireless communication capability. The UE is configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include but is not limited to a node B (NB) in the UMTS, an evolved node B (eNB) in LTE or LTE-A, a radio network controller (RNC) in UMTS, a BS controller (BSC) in the GSM/GERAN, a ng-eNB in an E-UTRA BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage.

Each cell (often referred to as a serving cell) provides services to serve one or more UEs within its radio coverage such that each cell schedules the downlink (DL) and optionally uplink (UL) resources to at least one UE within its radio coverage for DL and optionally UL packet transmissions. The BS can communicate with one or more UEs in the radio communication system via the plurality of cells.

A cell may allocate sidelink (SL) resources for supporting Proximity Service (ProSe) or Vehicle to Everything (V2X) service. Each cell may have overlapped coverage areas with other cells.

As discussed previously, the frame structure for NR supports flexible configurations for accommodating various next generation (e.g., 5G) communication requirements such as Enhanced Mobile Broadband (eMBB), Massive Machine Type Communication (mMTC), and Ultra-Reliable and Low-Latency Communication (URLLC), while fulfilling high reliability, high data rate and low latency requirements. The Orthogonal Frequency-Division Multiplexing (OFDM) technology in the 3rd Generation Partnership Project (3GPP) may serve as a baseline for an NR waveform. The scalable OFDM numerology such as adaptive sub-carrier spacing, channel bandwidth, and Cyclic Prefix (CP) may also be used.

Two coding schemes are considered for NR, specifically Low-Density Parity-Check (LDPC) code and Polar Code. The coding scheme adaption may be configured based on channel conditions and/or service applications.

When a transmission time interval (TTI) of a single NR frame includes DL transmission data, a guard period, and UL transmission data, the respective portions of the DL transmission data, the guard period, and the UL transmission data may be configured based on the network dynamics of NR. SL resources may also be provided in an NR frame to support ProSe services or V2X services.

Example description of some selected terms used in this disclosure are given below.

Cell: Radio network object that can be uniquely identified by a UE from a (cell) identification that is broadcasted over a geographical area from one UTRAN Access Point. A Cell is either FDD or TDD mode.

Serving Cell: For a UE in RRC_CONNECTED not configured with carrier aggregation (CA) or dual connectivity (DC), there is only one serving cell, which may be referred to as the primary cell. For a UE in RRC_CONNECTED configured with CA/DC, the term "serving cells" may be used to denote a set of cells including the Special Cell(s) and all secondary cells. A Serving Cell may be a PCell, a PSCell, or an SCell described in the 3GPP Technical Specification (TS) 38.331.

Hybrid Automatic Repeat Request (HARQ): HARQ is a functionality that ensures delivery between peer entities at Layer 1 (i.e., Physical Layer). A single HARQ process supports one Transport Block (TB) when the physical layer is not configured for downlink/uplink spatial multiplexing, and a single HARQ process supports one or multiple TBs when the physical layer is configured for downlink/uplink spatial multiplexing. There is one HARQ entity per serving cell. Each HARQ entity supports a parallel (number) of DL and UL HARQ process.

HARQ information: HARQ information for DL-shared channel (SCH) or for UL-SCH transmissions may include New Data Indicator (NDI), Transport Block size (TBS), Redundancy Version (RV), and HARQ process identity (ID).

Hybrid automatic repeat request acknowledgement (HARQ-ACK): A HARQ-ACK information bit value of 0 represents a negative acknowledgement (NACK) while a HARQ-ACK information bit value of 1 represents a positive acknowledgement (ACK).

Msg3: Message transmitted on UL-SCH containing a cell-radio network temporary identifier (C-RNTI) medium access control (MAC) control element (CE) or common control channel (CCCH) service data unit (SDU), submitted from upper layer and associated with the UE Contention Resolution Identity, as part of a Random Access procedure.

gNB: a node providing NR user plane and control plane protocol terminations towards the UE, and connected via the NG interface to the 5GC.

Timer: MAC entity can setup one or more timers for individual purposes, for example, triggering some uplink signaling retransmission or limiting some uplink signaling retransmission period. A timer is running once it is started, until it is stopped or until it expires; otherwise it is not running. A timer can be started if it is not running or restarted if it is running. A timer is started or restarted from its initial value. The initial value may be configured by the gNB via downlink RRC signaling, but not limited thereto.

Bandwidth Part (BWP): A subset of the total cell bandwidth of a cell is referred to as a BWP and bandwidth adaptation (BA) is achieved by configuring the UE with BWP(s) and telling the UE which of the configured BWPs is currently the active one. To enable BA on the PCell, the gNB configures the UE with UL and DL BWP(s). To enable BA on SCells in case of CA, the gNB configures the UE with DL BWP(s) at least (e.g., there may be none in the UL). For the PCell, the initial BWP is the BWP used for initial access. For the SCell(s), the initial BWP is the BWP configured for the UE to first operate at SCell activation. UE may be configured with a first active uplink BWP by a firstActiveUplinkBWP information element (IE). If the first active uplink BWP is configured for an SpCell, the firstActiveUplinkBWP IE field contains the ID of the UL BWP to be activated upon performing the RRC (re-)configuration. If the field is absent, the RRC (re-)configuration does not impose a BWP switch. If the first active uplink BWP is configured for an SCell, the firstActiveUplinkBWP IE field contains the ID of the uplink bandwidth part to be used upon MAC-activation of an SCell.

Physical downlink control channel (PDCCH): In the downlink, the gNB can dynamically allocate resources to UEs via an RNTI (e.g., C-RNTI, modulation and coding scheme-C-RNTI (MCS-C-RNTI), configured scheduling-RNTI (CS-RNTI)) on PDCCH(s). A UE may monitor the PDCCH(s) to find possible assignments when its downlink reception is enabled (activity governed by discontinuous reception (DRX) when configured). When CA is configured, the same C-RNTI applies to all serving cells.

Transport Block (TB): The data from the upper layer (or MAC) given to the physical layer is basically referred to as the transport block.

Non-terrestrial networks (NTN) refer to networks, or segments of networks, using an airborne or spaceborne vehicle for transmission. Spaceborne vehicles include Low Earth Orbiting (LEO) satellites, Medium Earth Orbiting (MEO) satellites, Geostationary Earth Orbiting (GEO) satellites, and Highly Elliptical Orbiting (HEO) satellites. Airborne vehicles include High Altitude Platforms (HAPs) encompassing Unmanned Aircraft Systems (UAS), such as Lighter than Air UAS (LTA) and Heavier than Air UAS (HTA) operating in altitudes typically between 8 and 50 km.

LEO based NTN network may include two network architecture options, a fixed beam and a moving beam. In the fixed beam architecture, each coverage area of satellite beams may be fixed in relation to earth. In contrast, in the moving beam architecture, satellite beams may not be steerable. The satellite beams may move with LEO satellites instead of tracking UEs. Each coverage area of satellite beams may move in relation to earth. The LEO based NTN includes two possible scenarios as transparent and regenerative LEO satellite networks, depending on equipped functions on board.

Transparent GEO satellite network refers to a relay-based NTN, including radio frequency (RF) functions only. The GEO satellites simply perform amplify-and-forward in space.

Transparent LEO satellite network refers to a relay-based NTN. In this case, the LEO satellites simply perform amplify-and-forward in space.

Regenerative LEO satellite network refers to a network architecture in which LEO satellites have full functions of a gNB on board. In this case, UEs on the ground are served directly by the satellites that orbit the Earth at a low altitude (e.g., 600 km or 1200 km). The satellite is controlled and linked to an NTN Gateway on the ground that connects to data network.

FIG. 1 includes a diagram 100 illustrating an example regenerative LEO satellite network according to an example implementation of the present disclosure. Satellite 110 is a space-borne vehicle embarking a telecommunication transmitter. In this example the satellite 110 may have full functions of a base station. An antenna equipped on the satellite 110 may generate a satellite beam. A service link 112 is a radio link between the satellite 110 and serving UEs, which include a handheld device 120 (e.g., a cellphone), a very small aperture terminal (VSAT) 122, and a mounted device 124 (e.g., a vehicle). A feeder link 114 is a wireless link between the satellite 110 and an NTN gateway 130, which is an earth station for accessing to the satellite 110. The NTN gateway 130 may be connected to a data network 132, such as 5G core network.

A HARQ process is a very time-critical mechanism. HARQ operation becomes even more critical at the extremely long round trip time (RTT) as in the case of NTN and extreme coverage scenarios. The HARQ process may require adaptation to support NTN.

In satellite communication, the RTT normally exceeds the maximum conventional HARQ timers (after which an ACK is received) or the maximum possible number of HARQ processes (a flexible pool of parallel HARQ processes). Table 1 below gives an overview of the minimum required number of HARQ processes for different satellite constellations, including LEO, MEO, and GEO.

TABLE 1:

The minimum required number of the HARQ processes

| Constellation | The number of HARQ processes | UE side feasibility |
| --- | --- | --- |
| Terrestrial | 16 | Feasible (Rel. 15) |
| LEO | 50 | Feasible (with HARQ extension) |

TABLE 1:-continued

The minimum required number of the HARQ processes

| Constellation | The number of HARQ processes | UE side feasibility |
| --- | --- | --- |
| MEO | 180 | May have impact on TBS/MCS |
| GEO/HEO | 600 | May have impact on TBS/MCS |

It should be noted that the required HARQ numbers in Table 1 are based on a 1 ms slot duration for 15 kHz reference subcarrier spacing (SCS). For larger SCS (e.g., $2^k \times 15$ kHz), the minimum required number of the HARQ processes may be scaled by $2^k$, where k is a positive integer.

Therefore, simply extending the number of HARQ processes linearly to RTT caused by the satellite channel may not be feasible for some UEs due to memory restriction and the maximum possible parallel processing channels. Furthermore, gNBs may also consider this latency impact on the number of their active HARQ processes. Therefore, at least the following principles may be considered in NTN scenarios: (1) Enhancing existing HARQ operation to extend the HARQ processing accommodating low to moderate NTN RTT delays; (2) Limiting HARQ capabilities and/or disabling HARQ due to long RTT delays.

The impact on NR HARQ operation due to the long RTT delay of NTN may need to be considered for the NTN UEs and serving gNBs when the number of HARQ processes is either extended to satisfy high-reliability scenarios or limited/disabled for longer NTN delays.

Adaptive Modulation and Coding (AMC) is another NR feature that may require adaptations to support NTN. As mentioned above, a UE operating in GEO satellite access networks may experience a one-way propagation time up to 270 ms. Using LEO satellite access network with 600 km orbit, the one-way propagation delay may change continuously between 2 ms and 7 ms. The slow reaction time is expected to have a performance impact on some of the physical layer procedures, particularly those with closed loops such as power control and AMC.

For Ka-band satellites, AMC is an essential tool that maintains a connection through rain fades, which typically changes more slowly than the 0.5 second round trip delay. It generally works well with some hysteresis to avoid excessive oscillations between two AMC modulation coding modes. But this reaction time is too slow for AMC to adapt for changes of signal strength for mobile terminals when a line of sight is interrupted by shadowing.

For GEO systems in S-band, the main issue is multipath fading, which can be much faster than a 0.5 second round trip delay. As such, AMC would not be able to follow it. AMC algorithm typically attempts to settle on a modulation coding mode that closes the link, if possible, by giving up some power to maintain a margin.

For LEO satellites, AMC may also be used to adapt for the large variation of free space loss. The variation is sufficiently slow compared to the 20 ms worst-case round-trip delay. It should also be able to react to shadowing fades to a large extent, but is still unable to follow fast fading.

In NR, the AMC procedure includes two major parts: channel quality index (CQI) reporting and modulation and coding scheme (MCS) scheduling. For the CQI reporting, if a channel state information (CSI) report is configured (e.g., CSI parameters and a CQI table are configured), the UE may report a CQI index as an MCS recommendation based on CSI measurement configured by the CSI parameters. For MCS scheduling, the UE may be configured with an MCS table via an RRC message, and dynamic AMC may be achieved by a dynamic downlink control information (DCI) indication from a serving gNB.

Figure 2:
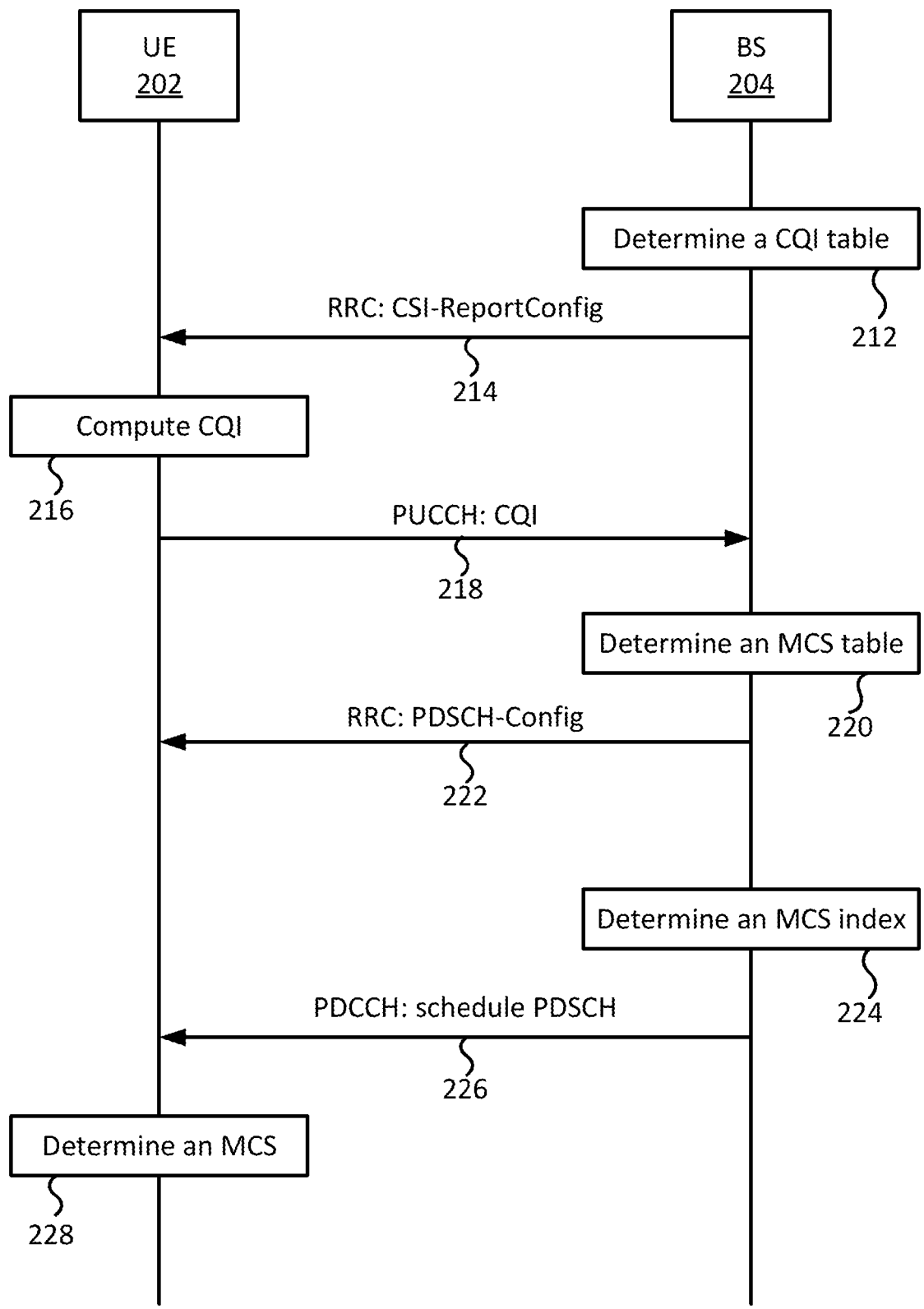
FIG. 2 is a diagram illustrating an example AMC procedure according to an example implementation of the present disclosure.

FIG. 2 is a diagram 200 illustrating an example AMC procedure according to an example implementation of the present disclosure. In action 212, the BS 204 (e.g., a gNB) may determine a CQI table from the three CQI tables specified in the NR specifications (e.g., 3GPP TS Release 15/16). These three tables represent MCS suggestions from the UE side, associated with different spectral efficiency requirements and block error rate (BLER) targets. In action 214, the BS may configure the CQI table via an RRC message (e.g., CSI-ReportConfig IE) to the UE 202.

In action 216, the UE 202 may compute CQI based on the configured CQI table. The CQI table is associated with a single BLER target. The UE 202 may select the highest CQI index with a transport block error probability not exceeding the BLER. In action 218, the UE 202 may report the resulted CQI via a physical uplink control channel (PUCCH) or physical uplink shared channel (PUSCH).

In action 220, the BS 204 may determine one of the three MCS tables specified in the NR specifications (e.g., 3GPP TS Rel-15/16) to schedule a PDSCH, based on the received CQI report. In action 222, the BS 204 may configure the determined MCS table via an RRC message (e.g., PDSCH-Config IE) to the UE 202.

In action 224, the BS 204 may determine an MCS index from the configured MCS table. In action 226, the BS 204 may configure the determined MCS index to the UE 202 via a PDCCH with DCI associated with the scheduled PDSCH.

In action 228, the UE 202 may determine an MCS based on the received MCS index and the configured MCS table. The MCS information is used for decoding and demodulating data from the scheduled PDSCH.

To accommodate NTN, long RTT and lower BLER target become challenging to reuse the NR AMC directly. Particularly, the feature of disabling HARQ for long RTT delays may require a more robust and dynamic AMC control. For example, if HARQ is disabled, the BLER target may need to be improved firstly to guarantee the reliability of the first transmission. Lower MCS and MCS table with lower target BLER may be needed when HARQ is disabled in NTN scenarios.

As mentioned, some adjustments are needed for the NR AMC to accommodate different NTN scenarios. Implementations are provided below for a UE that reports CSI consisting of CQI and/or has the capability of HARQ disabling.

Case 1: Configurable BLER for a CQI Report

When computing CQI in NR, e.g., Rel-15/16, a BLER target is given by a configured CQI table. For example, if one of the eMBB tables is configured, the BLER target is set to $10^{-1}$ for UE to select the highest CQI index with a BLER not exceeding the target. Otherwise, when the URLLC table is configured, the BLER target is set to $10^{-5}$ for CQI selection. In NR, the value of the BLER target is fixed for each configured CQI table. This one-to-one mapping may save additional signalling to select BLERs.

However, it may be necessary to have a flexible BLER configuration in NTN because of two reasons. First, a new BLER target may be needed if the URLLC table is going to be reused. This is because the original BLER target of $10^{-5}$ may be impossible to achieve regarding a very limited link budget in NTN, particularly for uplink. In one implementation, a higher BLER target, e.g., $10^{-1}$ or $10^{-2}$, may be configured to a UE regardless of which CQI table being used. Second, when HARQ switches off (HARQ is disabled), a higher BLER target may be needed to guarantee the first transmission. Without configurable BLERs, RRC reconfiguration signalling of another CQI table may be needed, which is time consuming and resource inefficient considering the long RTT.

Case 1-1: Introduce at Least One New BLER Target that is Applicable for at Least One of the Existing CQI Tables in Rel-15.

In one implementation, the new BLER target may be explicitly signalled by higher layer parameters, e.g., via RRC signaling. In one implementation, the new BLER target may be applied by default when one or more conditions are met, e.g., when HARQ is disabled and/or when an NTN scenario is indicated. In one implementation, the NTN scenario is indicated when the UE receives a satellite ID or an NTN-RNTI (a new RNTI).

The CQI indices and their interpretations are given in Table 5.2.2.1-2, Table 5.2.2.1-3, and Table 5.2.2.1-4, specified in the 3GPP TS 38.214 V15.5.0, for reporting CQI based on Quadrature Phase Shift Keying (QPSK), 16-Quadrature Amplitude Modulation (16QAM), 64QAM and 256QAM.

In one implementation, a new 4-bit table Table-NTN-CQI may be introduced. The CQI indices and their interpretations may be given in the new 4-bit table Table-NTN-CQI in a higher layer parameter cqi-Table for reporting CQI based on Binary Phase Shift Keying (BPSK), QPSK, 8PSK, and 16PSK. The new 4-bit table Table-NTN-CQI may be a CQI table used for NTN scenarios, including the modulation, the target code rate, and the associated spectral efficiency, used in the PDSCH and PUSCH.

Based on an unrestricted observation interval in time unless specified otherwise, the UE may derive, for each CQI value reported, the highest CQI index that satisfies the following condition in Table 2.

TABLE 2

- A single PDSCH transport block with a combination of modulation scheme, target code rate and transport block size corresponding to the CQI index, and occupying a group of downlink physical resource blocks termed the CSI reference resource, defined in the 3GPP NR specs, could be received with a transport block error probability not exceeding the following value:
    ○ If UE is configured with a new NTN-RNTI, and if an aperiodic CSI report is requested by DCI with CRC scrambled by the NTN-RNTI, or a semi-persistent CSI report is activated by a DCI format 0_i with CRC scrambled by the NTN-RNTI,
        • if a new higher layer parameter NTN-CQI-BLER is configured
            • BLER = $V_{BLER}$, a value indicated by NTN-CQI-BLER
        • else
            • if the higher layer parameter cqi-Table is configured
                ○ BLER = 0.1
            • else
                ○ BLER = 0.1 with Table-NTN-CQI, if applicable
                ○ otherwise BLER = 0.1 with Table 5.2.2.1-4

TABLE 2-continued

○ else,
- if CSI-ReportConfig is configured with a new higher layer parameter NTN-CQI-BLER
  - BLER = $V_{BLER}$, a value indicated by NTN-CQI-BLER
- else
  - BLER = 0.1, if the higher layer parameter cqi-Table configures 'table1' (corresponding to Table 5.2.2.1-2), or 'table2' (corresponding to Table 5.2.2.1-3), or 'table4' (corresponding to the new table Table-NTN-CQI)
  - BLER = 0.00001, if the higher layer parameter cqi-Table configures 'table3' (correcpondinf to Table 5.2.2. 1-4)

Note that in the above example, all the conditional UE behavior may have varied combinations and varied associations with the conditions. Also, the conditional UE behavior may be used separately.

The new NTN-RNTI may be an identity used by NR that is connected to 5GC in scheduling at cell level, referred to as a unique UE identification used for indicating that the current connection is under satellites, associated with enabling NTN specific features (e.g., the NTN specific rule of MCS table selection), or indicating NTN specific information (e.g., satellite ephemeris data).

If the UE is configured with the new NTN-RNTI or a new NTN-CS-RNTI, for the PDSCH scheduled by a PDCCH with DCI with CRC scrambled by the NTN-RNTI, the transport block error probability corresponding to the CQI index may not exceed a value of $K_{NTN}$, where $K_{NTN}$ is pre-defined/pre-determined/pre-configured.

The new NTN-CS-RNTI may be unique UE identification used for Semi-Persistent Scheduling (SPS) in the downlink or configured grant in the uplink for NTN scenarios.

If the UE is configured with a higher layer parameter NTN-HARQ set to be 'disabled' or the UE receives an indication for disabling HARQ, the UE may disable all or partial HARQ processes configured on the serving cell, and the transport block error probability corresponding to the CQI index may not exceed a value of $K_{NTN}$.

If the UE identifies multiple BLER targets in conflict with different values, the UE may use the largest BLER target among the BLER targets. For example, if both the values 0.00001 and 0.1 are configured as a BLER target, the UE may only use 0.1 with an applicable CQI table. Note that this may happen when HARQ switches off and cqi-Table configures 'table3'.

Case 2: Configurable MCS Table for Random Access Channel (RACH) Procedure

During the RACH procedure, the UE may receive a random-access response (RAR) grant, where a 4-bit MCS index in the RAR grant field is used for determining the MCS of the PUSCH transmission known as Message 3 (msg3) transmission. When the UE is not configured with any MCS tables before the RACH procedure, two default MCS tables may be used. Both are for eMBB requirements, where one is used if transform precoding is enabled, and the other is used when transform precoding is disabled.

However, it may be necessary to have an adjustment for the default MCS tables due to a limited link budget for UL channels. Note that this issue also exists when two-step RACH is used during a message A payload transmission.

Case 2-1: Introduce a New MCS Table in the RACH Procedure

In one implementation, the configuration may be transmitted via system information block (SIB) broadcasting. When multiple MCS tables are provided, the UE may select an MCS table for RACH based on a predetermined rule. For example, when an NTN scenario is indicated, a predetermined table is used.

From the physical layer perspective, the four-step random access procedure includes the transmission of random access preamble (Msg1) in a PRACH, random access response (RAR) message with a PDCCH and PDSCH (Msg2), and when applicable, the transmission of a PUSCH (Msg3) scheduled by a RAR UL grant, and PDSCH for contention resolution (Msg4). Table 3 below lists an example procedure for determining the MCS.

TABLE 3

For Msg2 and Msg4, if a UE is not configured with MCS tables associated with the PDSCH transmission,
- if NTN scenario is identified, e.g., a UE is configured by a new higher layer parameter NTN-Common-TA or if a UE is configured by a new higher layer parameter NTN-Satellite-ID in System information (SI), or if UE is configured with a higher parameter 'NTN-HARQ' set to be 'disabled',
  ○ an MCS table for the PUSCH transmission is given in a new table Table-NTN-MCS-transform, if transform precoding is configured, or another new table Table-NTN-MCS, if applicable,
  ○ otherwise, an MCS table is given by Table 6.1.4.1-1 specified in TS 38.214 if the transform precoding is configured or Table 5.1.3.1-3 specified in TS 38.214 for PDSCH transmission under URLLC service
- else
  the UE determines the MCS of the PUSCH transmission from the first sixteen indexes of the applicable MCS index table for PUSCH as described in the 3GPP NR specs For Msg2, if the UE detects the DCI format 1_0 with CRC scrambled by the corresponding RA-RNTI and a transport block in a corresponding PDSCH within a time window specified in the 3GPP NR specs, the UE passes the transport block to higher layers. If the higher layers identify a random-access preamble identity (RAPID) in the RAR message(s) from the transport block, the higher layers indicate an uplink grant to the physical layer. This is referred to as RAR UL grant in the physical layer.

A RAR UL grant schedules a PUSCH transmission from the UE. The contents of the RAR UL grant are listed below:
Frequency hopping flag, 1 bit
PUSCH frequency resource allocation, 14 bits
PUSCH time resource allocation, 4 bits
MCS, 4 bits
TPC command for PUSCH, 3 bits
CSI request, 1 bit Table 4 below lists another example procedure for determining the MCS.

TABLE 4

If a UE is configured by a new higher layer parameter NTN-msg3-mcs-table in the higher layer parameter SystemInformationBlockType1 (SIB1) or SystemInformation (SI)
- an MCS table for the PUSCH transmission (Msg3) is indicated by NTN-msg3-mcs-table, and
- the UE determines the MCS of the PUSCH transmission from the first sixteen indexes, e.g., 4 bits of MCS index in the RAR UL grant, and from the indicated MCS table by NTN-msg3-mcs-table.

If the parameter NTN-msg3-mcs-table is not configured,
- if NTN scenario is identified, e.g., a UE is configured by a new higher layer parameter NTN-Common-TA or if a UE is configured by a new higher layer parameter NTN-Satellite-ID in SI, or if UE is configured with a higher parameter 'NTN-HARQ' set to be 'disabled',
    ○ an MCS table for the PUSCH transmission is given in a new table Table-NTN-MCS-transform if transform precoding is configured, or another new table Table-NTN-MCS if applicable,
    ○ otherwise, an MCS table is given by Table 6.1.4.1-1 specified in TS 38.214 if the transform precoding is configured or Table 5.1.3.1-3 specified in TS 38.214 for PDSCH transmission under URLLC service
- else
    ○ the UE determines the MCS of the PUSCH transmission from the first sixteen indexes of the applicable MCS index table for PUSCH as described in the 3GPP NR specs Note that in the above example, all the conditional UE behavior may have different combinations and associations with their conditions or may be used separately.

The determined MCS may be used for Msg3 transmission. The UE may transmit a transport block in a PUSCH scheduled by a RAR UL grant in a corresponding RAR message using the determined MCS.

Some descriptions for the introduced new parameters and tables are listed below:

NTN-msg3-mcs-table: a higher layer parameter that indicates the MCS table the UE may use for the PUSCH transmission of Msg3 with or without transform precoding.

Table-NTN-MCS-transform: a 5-bit MCS table based on BPSK, QPSK, 8PSK, and 16PSK that the UE may use for PUSCH with transform precoding.

Table-NTN-MCS: a 5-bit MCS table based on BPSK, QPSK, 8PSK, and 16PSK that the UE may use for PUSCH without transform precoding.

NTN-Common-TA: a higher layer parameter that indicates common timing advance (TA), e.g., two times of transmission delay between network and reference point, from network to UE on a cell-specific basis.

NTN-Satellite-ID: a higher layer parameter that indicates a physical satellite identity that the UE may use for mobility, initial access, and physical layer procedures enhancement if the satellite ephemeris data is applicable.

If the UE identifies multiple MCS tables indicated on a serving cell in a conflicting manner, the UE may use the MCS table with the lowest spectral efficiency among the configured MCS tables. For example, if both Table 5.1.3.1-3 (e.g., for the URLLC service) and Table 5.1.3.1-2 (e.g., for the eMBB service) specified in TS 38.214 are configured in a conflicting manner, the UE may determine the MCS based on Table 5.1.3.1-3.

For a case of using two-step RACH, an example of the two-step RACH procedure is given below. Before starting the two-step RACH, the UE may receive and process synchronization signal block (SSB)/SIB/reference signal (RS) from the serving cell. The configuration information, e.g., NTN-msg3-mcs-table, and an MCS index, for the two-step RACH may be carried by SI. For RRC_CONNECTED UE, the configuration may also be carried by dedicated RRC signalling.

Step 1 of the two-step RACH: Based on the configuration information for the two-step RACH, the UE may transmit the preamble and the payload in the PUSCH as message A transmission, where the payload transmission may be based on the configured MCS for determining modulation, coding rate, and TB size. The configured MCS may be indicated via an index linking to NTN-msg3-mcs-table.

Step 2 of the two-step RACH: After message A is transmitted, the UE may monitor Message B within a RAR window. If UE can decode the Message B in response to its latest Message A transmission before the RAR window expires, the two-step RACH procedure is successfully completed.

It should be noted that MCS selection for the two-step RACH may have a very limited number of options, e.g., 2 or 3 options for different MCS schemes. In this case, MCS selection may be implemented by a combination of RAPID and Satellite ID, e.g., using QPSK if a 6-bit RAPID is greater than 16 and only if Satellite ID is not identified.

Case 3: Polarization Mismatch

In Release 15 NR, CQI may be calculated conditioned on the reported precoding matrix indicator (PMI), a rank indicator (RI), and CSI-RS resource indicator (CRI). PMI may be calculated based on a precoding codebook specified in the 3GPP NR specs. One or multiple linear precoding matrixes may be selected from the precoding codebook to maximize a given performance metric, e.g., mutual information associated with signal to interference plus noise ratio (SINR), in the spatial domain, specified as antenna ports in the 3GPP NR specs. An antenna port may be implemented by a single linear polarization antenna element, either vertically or horizontally polarized.

However, in satellite communication, the antennas on satellites are typically circular-polarized, e.g., left-hand circular polarization (LHCP) or right-hand circular polarization (RHCP), rather than linear polarization typically used in the terrestrial network (TN). For S-band, if the UE has an omnidirectional antenna of linear polarization and the antenna onboard a satellite is circularly polarized, such polarization mismatch may lead to 3 dB loss in the radio link budget. The polarization mismatch between the satellites and the UE may also lead to an imprecise CQI report, due to imprecise PMI estimation of the UE.

It should be noted that not all UEs use an omnidirectional antenna of linear polarization. Some UEs, e.g., VSAT based, have directional antennas of circular polarization. Also, some advanced UEs may have the capability to compensate the polarization mismatch via multiple antenna elements characterized with a linear-polarized yet cross-polarized property.

Case 3-1: Introduce a Capability of Polarization-Mismatch Compensation for CQI

In one implementation, the mismatch compensation may be enabled or disabled via an RRC parameter associated with a CSI report configuration. When the mismatch compensation is supported and enabled, the UE may derive CQI parameters based on the assumption that circular-polarized antennas are used by the BS (e.g., a gNB).

In one implementation, the UE may perform a capability report to indicate whether the UE supports the compensation for the polarization mismatch. VSAT UEs typically have circular-polarization antennas. In one implementation, the UE may support the mismatch compensation by default. In one implementation, the UE may use a capability report to indicate its support for the compensation or indicate the UE type as VSAT.

Vehicle-mounted UEs may have linearly or circularly polarized antennas. In one implementation, the UE may report its support for the mismatch compensation. In one implementation, the UE may explicitly report the type of its antenna polarization.

Handheld UEs typically have linear-polarized antennas. In one implementation, the UE may not support the mismatch compensation by default if there is no capability report.

Table 5 below lists assumptions made by the UE when deriving the CQI index.

Note that a circularly polarized antenna may be equivalent to a linear cross-polarized antenna, e.g., two antenna ports with one-layer data transmission according to the NR specs (for example, Rel-15/16 as in TS 38.211/38.212/38.214 V15.5.0), from the perspective of a UE. In this sense, if a new higher layer parameter circular polarization is set to be 'true', the UE may enable mismatch compensation for strengthening signal reception, if capable.

In one implementation, a UE may perform a capability report to indicate whether it supports the mismatch compensation, for example, to indicate whether the feature has been implemented and successfully tested. Several new UE radio access capability parameters may be introduced for the capability report, including circular-polarization-compensation, circular-polarization-awareness, NTN-UE-VSAT, NTN-UE-vehicle and NTN-UE-handheld.

The parameter circular-polarization-compensation indicates whether UE supports the mismatch compensation between circular and linear polarization, used at least for, but not limited to, CQI derivation and strengthening the received signal quality.

The parameter circular-polarization-awareness indicates whether UE supports the awareness of the polarization mismatch, used at least for, but not limited to, CQI derivation.

The parameter NTN-UE-VSAT indicates whether UE supports VSAT characteristics, detailed in Table 6 below as an example.

The parameter NTN-UE-Other indicates whether UE supports moving platforms (e.g., aircraft, vessels), building mounted devices characteristics, detailed in Table 6 below as an example.

The parameter NTN-UE-handheld indicates whether UE supports handheld characteristics detailed in Table 6 below as an example.

Table 6 below lists characteristics for different UE types. X-pol in Table 6 means cross polarization.

TABLE 5

If configured to report CQI index, based on CSI reference resource(s), the UE may assume the following for the purpose of deriving the CQI index, and if also configured, for deriving PMI and RI:
- if a new higher layer parameter circular-polarization in, for example, CSI-ReportConfig is configured and is set to be 'true',
  ○ assume the antenna onboard space-born, e.g., satellites, is circular-polarized
- else,
  ○ assume the antennas is linear-polarized.
- follow other existing assumptions in NR, for example, Rel-15/16 as in TS 38.214 V15.5.0, for deriving the CQI index, e.g.,
  ○ the bandwidth as configured for the corresponding CQI report.
  ○ redundancy version 0.
  ○ assume no resource elements (REs) allocated for non-zero power (NZP) CSI-RS and zero power (ZP) CSI-RS.
  ○ assume the PDSCH symbols are not containing demodulation reference signal (DM-RS).

TABLE 6

| Characteristics | VSAT | Handheld | Other (Note 1) |
| --- | --- | --- | --- |
| Frequency band | Ka band (i.e. 30 GHz UL and 20 GHz DL) | S band (i.e. 2 GHz) | Ka band (i.e. 30 GHz UL and 20 GHz DL) |
| Antenna type and configuration | Directional | (1, 1, 2) with omni-directional antenna element | Directional |
| Polarization | circular | Linear: +/−45°X-pol | Linear: +/−45°X-pol |
| Rx Antenna gain | 39.7 dBi | 0 dBi per element | 8 dBi per element |
| Antenna temperature | 150K | 290K | 290K |
| Noise figure | 1.2 dB | 7 dB | 9 dB |
| Tx transmit power | 2 W (33 dBm) | 200 mW (23 dBm) | [20 W (43 dBm)] |
| Tx antenna gain | 43.2 dBi | 0 dBi per element | 8 dBi per element |

Note 1:
Moving platforms (e.g., aircraft, vessels), building mounted devices.

These UE capability parameters may be signaled per UE, per band, per band combination, per band per band combination, or per component carrier per band per band combination. The term "per band" may indicate that the UE reports the associated parameter, capability of the mismatch compensation on each configured band to indicate whether the feature is supported on a per band basis.

In one implementation, the UE compiles the capability report and transfers its UE capability information upon receiving a higher layer parameter UECapabilityEnquiry, specified in the 3GPP NR specs, from the network.

Figure 3:
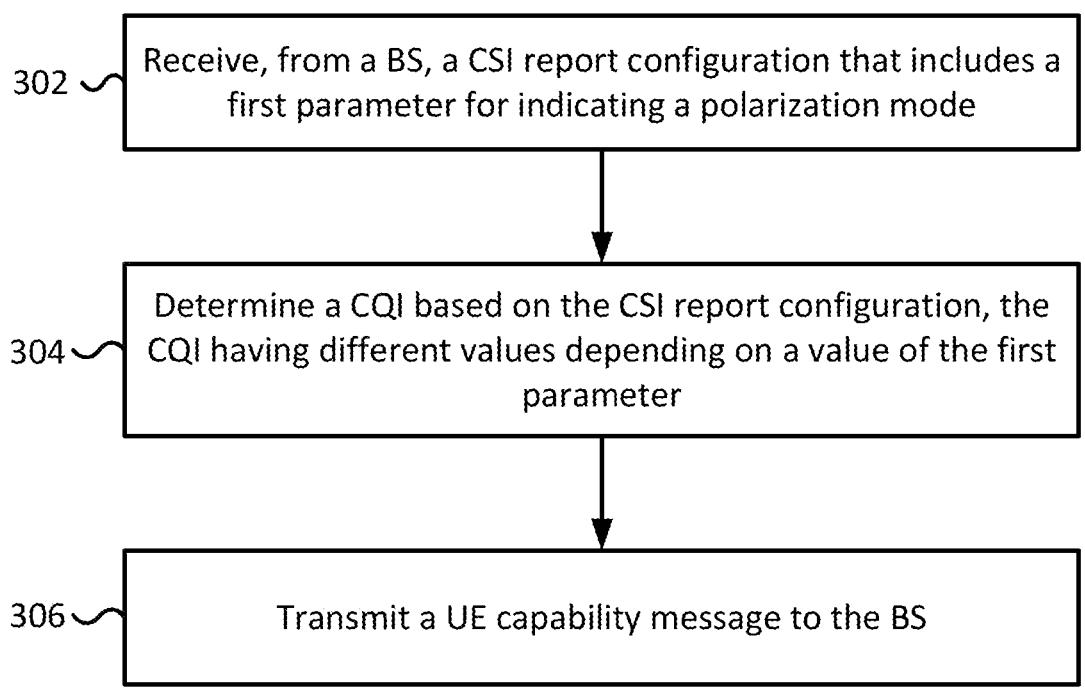
FIG. 3 is a flowchart of a method performed by a UE for handling polarization mismatch according to an example implementation of the present disclosure.

FIG. 3 is a flowchart of a method performed by a UE for handling polarization mismatch according to an example implementation of the present disclosure. In action 302, the UE may receive, from a BS, a CSI report configuration that includes a first parameter for indicating a polarization mode. In one implementation, the first parameter may be the parameter circular-polarization. In one implementation, the UE may enable mismatch compensation based on the received first parameter.

In action 304, the UE may determine a CQI based on the CSI report configuration. The CQI may have different values depending on a value of the first parameter. For example, the value of the CQI derived by the UE when the parameter circular-polarization is 'true' may be different from the value of the CQI when the parameter circular-polarization is 'false.'

In action 306, the UE may transmit a UE capability message to the BS. In one implementation, the UE may transmit the UE capability message upon being requested by the BS. The UE capability message may include at least one of the following: a parameter for indicating whether the UE supports mismatch compensation between different polarization modes (e.g., circular-polarization-compensation), a parameter for indicating whether the UE supports awareness of polarization mismatch (e.g., circular-polarization-awareness), a parameter for indicating whether the UE supports VSAT characteristics (e.g., NTN-UE-VSAT), a parameter for indicating whether the UE supports handheld characteristics (e.g., NTN-UE-handheld), and a parameter for indicating whether the UE supports vehicle characteristics (e.g., NTN-UE-Other).

It should be noted that one or more actions illustrated in FIG. 3 may be omitted in some implementations.

Case 4: UE Assisted HARQ-Feedback-Less Retransmission

If HARQ is disabled, the BLER target may need to be improved firstly to guarantee the reliability of the first transmission. Alternatively, this may be done by setting repetition based on slot aggregation with RV cycling or HARQ-less repetitions, which is also known as blind repetitions specified in Rel-15 LTE Higher-Reliability and Low-Latency Communication (HRLLC). Reliability of a data packet can be improved with the considered retransmissions with some compromise on resource efficiency.

In one implementation, the UE may report the number of transmissions for a TB.

In one implementation, the reporting may take place after receiving the first transmission. The reporting may indicate the number of retransmissions, which may be implicitly carried by HARQ-ACK information bits via uplink control information (UCI) reporting. HARQ-ACK feedback may or may not be performed for the subsequent retransmissions.

In one implementation, the reporting may be transmitted together with the CSI report. The reporting may indicate the number of retransmissions and the corresponding CQI. The retransmission information bits may be included in CSI bits via UCI reporting.

UE assisted HARQ-feedback-less retransmission may provide side information for the network (NW) to schedule multiple transmissions with the same TB. This may be accomplished by associating the UE assistance information with higher layer parameters related to aggregation factors of PDSCH or PUSCH.

Case 4-1: A New Interpretation for HARQ-ACK Information if Disabled

A HARQ entity for each Serving Cell maintains parallel HARQ processes. Each HARQ process includes HARQ information, e.g., HARQ-ACK, associated with a HARQ process identifier and one or two TB(s) received on the DL-SCH of the corresponding HARQ processes.

When HARQ is enabled, a HARQ-ACK information bit value of 0 may indicate a negative acknowledgement (NACK) while a HARQ-ACK information bit value of 1 may indicate a positive acknowledgement (ACK).

When HARQ is disabled, the HARQ-ACK information bits, if present, may be interpreted in a new way. In one implementation, a HARQ-ACK information bit value of 0 may indicate a suggestion for decreasing the configured number of retransmissions (NACK-for-Less), e.g., from 4 repetitions to 2 repetitions. A HARQ-ACK information bit value of 1 may indicate a suggestion for increasing the configured number of retransmissions (ACK-for-More), e.g., from 2 repetitions to 4 repetitions. This suggestion for retransmissions may be used per TB, per HARQ process, per cell, per logical channel, or per UE, depending on the implementation.

When HARQ is enabled or disabled, each HARQ process associated with a HARQ process ID may include more than one HARQ-ACK information bit, based on some new predefined conditions, e.g., indicated by NW, carried by an UCI transmission or by multiple UCI transmissions. The HARQ-ACK information bits may be interpreted in a new way. For example, HARQ-ACK information bit string of {0,0} may indicate a request of a retransmission number as 1, the information bit string of {0,1} may indicate a request of a retransmission number as 2, the information bit string of {1,0} may indicate a request of a retransmission number as 4, and the information bit string of {1,1} may indicate a request of a retransmission number as 8. In one implementation, the payload of HARQ-ACK feedback for a HARQ process may be fixed and configured. In the example above, a HARQ process may be provided with 2 bits for its HARQ-ACK feedback, irrespective of its associated number of TB s.

The above examples may be implemented in varying manners, e.g., a HARQ-ACK information bit value of 0 may indicate null, increasing the configured number of retransmissions, or buffer flushed indication. Meanwhile, a HARQ-ACK information bit value of 1 may indicate null, decreasing the configured number of retransmissions, or buffer flushed indication. The same flexible rule may also apply when the HARQ-ACK information bits have more than one bit.

Case 4-2: Retransmission Request Carried by CSI Reporting

In one implementation, a CSI report may include CQI, PMI, CSI-RS resource indicator (CRI), and a new parameter Retransmission Number Indicator (RNI). A UE may be configured by higher layers with CSI report settings (e.g., CSI-ReportConfig IE), which may indicate CQI, PMI, CRI, RNI, and the time and frequency resource for reporting CSI.

In one implementation, the RNI may be calculated conditioned on the reported CQI, PMI, RI, and CRI, if reported.

If the UE is configured with the CSI-ReportConfig with the higher layer parameter reportQuantity set to a new value 'cri-RI-PMI-CQI-RNI', the UE may report a preferred retransmission number for the entire reporting band or per sub-band, depending on PMI configuration. The CQI may be calculated conditioned on the reported RNI assuming the parameter RNI indicates the number of repetitions of a TB within a bundle of the downlink assignment.

Table 7 below lists assumptions made by the UE when deriving the CQI index.

TABLE 7

If configured to report CQI index in a CSI reference resource (e.g., described in Case 5), the UE may assume the following for the purpose of deriving the CQI index.
- N≥1 repetition indicated by RNI to be applied to the transmitted transport block PDSCH reception, and the redundancy version pattern to be applied to the repetitions is given by
  ○ the indicated RV pattern, if configured or indicated by NW.
  ○ {0,2,3,1} if no pattern is indicated by NW
- Redundancy version 0, if RNI is not reported.

In one implementation, a UE may perform CSI reporting that includes RNI using PUSCH or PUCCH, if configured by higher layers for CSI reporting settings. The associated CSI resource settings in the PUSCH or PUCCH are configured by the higher layers.

Case 4-2-1: CSI Reporting Using PUSCH

For Type I and Type II CSI feedback on PUSCH, a CSI report may include two parts. Part 1 has a fixed payload size and is used to identify the number of information bits in Part 2. Part 1 may be transmitted in its entirety before Part 2.

For Type I CSI feedback, Part 1 contains RI (if reported), CRI (if reported), CQI for the first codeword. Part 2 contains RNI (if reported), PMI (if reported) and contains the CQI for the second codeword when RI (if reported) is larger than 4.

For Type II CSI feedback, Part 1 contains RI (if reported), CQI, and an indication of the number of non-zero wideband amplitude coefficients per layer for the Type II CSI. The fields of Part 1—RI (if reported), CQI, and the indication of the number of non-zero wideband amplitude coefficients for each layer—are separately encoded. Part 2 contains RNI (if reported) and the PMI of the Type II CSI. Part 1 and 2 are separately encoded.

Case 4-2-2: CSI Reporting Using PUCCH

When the PUCCH carries Type I CSI with wideband frequency granularity, the CSI payload carried by the PUCCH format 2 and PUCCH formats 3 or 4 are identical and the same irrespective of RI (if reported), CRI (if reported), RNI (if reported). For type I CSI sub-band reporting on PUCCH formats 3 or 4, the payload is split into two parts. The first part contains RI (if reported), CRI (if reported), CQI for the first codeword. The second part contains PMI, RNI, and contains the CQI for the second codeword when RI>4.

A semi-persistent report carried on the PUCCH formats 3 or 4 supports Type II CSI feedback, but only Part 1 of Type II CSI feedback.

Case 4-2-3: CSI Processing Criteria

For a CSI report with CSI-ReportConfig with higher layer parameter reportQuantity set to 'cri-RI-PMI-CQI', 'cri-RI-i1', 'cri-RI-i1-CQI', 'cri-RI-CQI', 'cri-RI-LI-PMI-CQI', or 'cri-RI-PMI-CQI-RNI':
- if the CSI report is aperiodically triggered without transmitting a PUSCH with either transport block or HARQ-ACK or both when L=0 CPUs are occupied, where the CSI corresponds to a single CSI with wideband frequency-granularity and to at most 4 CSI-RS ports in a single resource without CRI report and where codebookType is set to 'typeI-SinglePanel' or where reportQuantity is set to 'cri-RI-CQI', $0_{CPU}=N_{CPU}$,
- otherwise, $0_{CPU}=K_s$, where $K_s$ is the number of CSI-RS resources in the CSI-RS resource set for channel measurement.
- Where $0_{CPU}$ is the number of occupied CPUs corresponding to N≥1 CSI reports and $N_{CPU}$ is the number of supported simultaneous CSI calculations, specified in TS. 38.214.

Case 5: Long-Term CQI Prediction

In Release 15 NR, for reporting CQI, a UE may derive for each CQI value reported in an uplink slot based on the following:
- If a UE is not configured with higher layer parameter timeRestrictionForChannelMeasurements, the UE may derive the channel measurements for computing CSI value reported in an uplink slot based on only the NZP CSI-RS, no later than the CSI reference resource associated with the CSI resource setting.
- If a UE is configured with higher layer parameter timeRestrictionForChannelMeasurements in CSI-ReportConfig, the UE may derive the channel measurements for computing CSI reported in an uplink slot based on only the most recent (e.g., no later than the CSI reference resource) NZP CSI-RS associated with the CSI resource setting.

However, regarding a need of long-term CQI prediction to accommodate the long RTT for most NTN scenarios, it may be necessary to have a clear boundary in time either for long-term CSI measurement or CQI prediction. For current CQI computing, either derived based on an unrestricted observation interval in time or based on only the most recent NZP CSI-RS, there is no clear interval in the time specified as a predicted interval or a long-term measurement interval for prediction. The predicted interval may be needed if the CQI prediction is derived by the UE, while alternatively the long-term measurement interval in time may be needed if the CQI prediction is handled by the gNB.

Case 5-1: UE is Provided with a Sliding Window. CSI Report May be Calculated Only Based on the Measured Samples from the Sliding Window.

In one implementation, the UE may be provided with a time duration in which the UE may perform CSI calculation based on the samples taken from the time duration. For a given time duration length X, the time duration may start from $t_{n-x}$ till $t_n$, where $t_n$ is the current time.

In one implementation, the UE may be provided with consecutive measured samples that may be used for CSI calculation. The consecutive measured samples may include the latest sample, but no later than $t_n$.

Case 5-2: UE is Provided with a Prediction Window in Time. CSI Report May be Calculated Specifically for the Indicated Prediction Window.

In one implementation, the UE may be provided with a time duration for upcoming time slots in which the UE may perform CSI calculation based on the samples to predict CQI for the future time duration. For a given time duration length X, the time duration may start from $t_n$ till $t_{n+x}$ where $t_n$ is the current time.

In one implementation, the future time duration may be specified by absolute time or consecutive time slots based on SCS used in a DL active BWP on a serving cell.

Implementation details for the long-term CQI prediction are provided below.

In one implementation, the CQI value may be derived based on an unrestricted observation interval in time unless indicated otherwise by higher layer parameters associated with a time restriction on channel and interference measurements.

A CSI reference resource for a serving cell may be defined as follows:

In the frequency domain, the CSI reference resource is defined by the group of downlink physical resource blocks corresponding to the band to which the derived CSI relates.

In the time domain, the CSI reference resource for a CSI reporting in the uplink slot n is defined by a single valid downlink slot that is the most recent but no later than slot n.

A slot in a serving cell may be considered as a valid downlink slot if (a) it includes at least one higher layer configured downlink or flexible symbol, and (b) it does not fall within a configured measurement gap for that UE.

If a UE is configured with higher layer parameter timeRestrictionForChannelMeasurements with a new higher layer parameter Measurement-Window,
the UE may derive the channel measurements for computing CSI based on only the NZP CSI-RS within the configured measurement window, no later than the CSI reference resource associated with the CSI resource setting.

the new higher layer parameter Measurement-Window may be set to 'sl1', 'sl2', 'sl4', where all values are in a number of slots, or set to 'ms10', 'ms20', 'ms40', where all values are in a number of milliseconds.

If a UE is configured with higher layer parameter timeRestrictionForChannelMeasurements with a new higher layer parameter Prediction-Window,
the UE may derive the channel measurements for computing CSI value based on only the NZP CSI-RS, which may be no later than the CSI reference resource associated with the CSI resource setting, aiming for a preferred CSI prediction within the configured prediction windows.

the start timing of the prediction window is no earlier than the CSI reference resource, e.g., the start timing of the prediction window may be contiguous with the last OFDM symbol of the valid DL slot including the CSI reference resource.

The new higher layer parameter Prediction-Window may be set to 'sl1', 'sl2', 'sl4', where all values are in a number of slots, or set to 'ms10', 'ms20', 'ms40', where all values are in a number of milliseconds.

If a UE is configured with higher layer parameter timeRestrictionForinterferenceMeasurements in CSI-ReportConfig with a new higher layer parameter Measurement-Window,
the UE may derive the interference measurements for computing the CSI value reported based on the CSI-IM and/or NZP CSI-RS for interference measurement described in TS 38.211 (e.g., V15.5.0) within the configured measurement window, which may be no later than the CSI reference resource associated with the CSI resource setting.

the end timing of the measurement window is no later than the CSI reference resource.

The new higher layer parameter Measurement-Window may be set to 'sl1', 'sl2', 'sl4', where all values are in a number of slots, or set to 'ms10', 'ms20', 'ms40', where all values are in a number of milliseconds.

If a UE is configured with higher layer parameter timeRestrictionForinterferenceMeasurements in CSI-ReportConfig with a new higher layer parameter Prediction-Window,
the UE may derive the interference measurements for computing the CSI value reported based on the CSI-IM and/or NZP CSI-RS for interference measurement described in TS 38.211, which may be no later than the CSI reference resource associated with the CSI resource setting, aiming for a preferred CSI prediction within the configured prediction windows.

the start timing of the prediction window is no earlier than the CSI reference resource, e.g., the start timing of the prediction window may be contiguous with the last OFDM symbol of the valid DL slot including the CSI reference resource.

the new higher layer parameter Prediction-Window may be set to 'sl1', 'sl2', 'sl4', where all values are in a number of slots, or set to 'ms10', 'ms20', 'ms40', where all values are in a number of milliseconds.

In one implementation, a UE may perform a capability report to indicate the duration or the length of the measurement window and the prediction window. The capability report may include UE radio access capability parameters, which may include a new parameter measurement-length and/or a new parameter prediction-length, indicating the maximum number of supporting duration or length.

In one implementation, the UE compiles the capability report and transfers its UE capability information upon receiving a higher layer parameter UECapabilityEnquiry from the network.

If the UE is configured with a CSI-ReportConfig with the higher layer parameter reportQuantity set to a new value 'cri-RI-PMI-CQI-PCQI', the UE may report a predicted CQI (PCQI) index for the entire reporting band, or per sub-band, depending on CQI configuration.

In one implementation, if the UE is configured to report the PCQI index, the UE may derive the channel and the interference measurements for computing CSI within the configured measurement window, which may be no later than the CSI reference resource associated with the CSI resource setting.

In one implementation, if the UE is configured to report the PCQI index, the UE may derive the channel and the interference measurements for computing CSI value, which may be no earlier than the CSI reference resource associated with the CSI resource setting, aiming for a preferred CSI prediction within the configured prediction windows.

In one implementation, a UE may perform CSI reporting that includes the PCQI using PUSCH or PUCCH, if configured by higher layers for CSI reporting settings. The associated CSI resource settings in the PUSCH or PUCCH are configured by the higher layers.

Case 6: HARQ-Dependent Control for CSI Report

In Release-15 NR, the time-domain behavior of the CSI reporting can be set to aperiodic, periodic, or semi-persistent. For periodic and semi-persistent CSI Resource Settings, the number of CSI-RS Resource Sets configured is limited to S=1. Within the configured CSI-RS resource set, all the CSI-RS resources share the same configurations, and they can be configured, reconfigured, activated, or deactivated on a group basis. In satellite systems, the long RRT may prevent prompt CQI response for aperiodic CSI reporting. Hence, periodic (P) or semi-persistent (SP) CSI reporting may be beneficial on resource efficiency.

However, when HARQ is disabled for some scenarios, e.g., connecting to GEO satellite systems or a high rate requirement service, the configured P/SP CSI reports may need an enhancement to accommodate such cases. For example, the configured P/SP CSI reports may only provide short-term CQI information, configured with an insufficient periodicity, which may be either too short or too long, or being a burden of resource efficiency for a very limited uplink budget. Those may not be useful after HARQ switches off.

In one implementation, the UE may drop the CSI report after HARQ is disabled. The UE may suspend CSI configuration and stop CSI measurement on the related CSI-RS.

In one implementation, when HARQ is disabled on the serving cell, the following procedures may be suspended or deactivated.

If the UE is in an active semi-persistent CSI reporting configuration on PUSCH, the CSI reporting may be deactivated when HARQ is disabled on the serving cell. Another activation command may be required to enable the semi-persistent CSI reporting.

If the UE has an active semi-persistent CSI-RS/CSI-IM resource configuration or an active semi-persistent ZP CSI-RS resource set configuration, and if the UE has not received a deactivation command, the activated semi-persistent CSI-RS/CSI-IM resource set or the activated semi-persistent ZP CSI-RS resource set configurations are considered to be active when HARQ is not disabled on the serving cell; otherwise they are considered suspended.

If the UE is in an active semi-persistent CSI reporting configuration on PUCCH, and if the UE has not received a deactivation command, the CSI reporting may take place when HARQ is not disabled on the serving cell; otherwise, the CSI reporting may be suspended.

If the UE has an active semi-persistent Sounding Reference Signal (SRS) resource configuration and has not received a deactivation command, the semi-persistent SRS configuration may be active when HARQ is not disabled on the serving cell; otherwise, it is considered as suspended.

In NR, HARQ mechanism is a structure with multiple stop-and-wait protocols, each operating on a single transport block. In a stop-and-wait protocol, the transmitter stops and waits for an acknowledgment after each transmitted transport block. The only feedback required is a single bit indicating positive or negative acknowledgment of the transport block.

However, since the transmitter stops after each transmission, the throughput is low. Therefore, multiple stop-and-wait processes operating in parallel are used. This structure, multiple HARQ processes operating in parallel to form one HARQ entity, combines the simplicity of a stop-and-wait protocol while still allowing continuous transmission of data.

In NR, soft combining is an important part of the HARQ mechanism. The receiver combines the received signal from multiple transmission attempts. With incremental redundancy, each retransmission does not have to be identical to the original transmission. Instead, multiple sets of coded bits are generated, each representing the same set of information bits. The rate-matching functionality of NR is used to generate different sets of coded bits as a function of the redundancy version.

For proper operation of soft combining, the receiver needs to differentiate between the reception of an initial transmission and the reception of a retransmission. This may be handled by a new-data indicator (NDI) for DL and UL HARQ in NR.

If the max number of HARQ processes is 16 for DL and UL, the long scheduling delay in NR-NTN may significantly reduce the peak data rates. For transparent GEO, the available peak throughput may be 3.2% (=16/500) of NR terrestrial peak throughput. For transparent LEO, the available peak throughput may be around 57% (=16/28) of NR terrestrial peak throughput.

However, simply extending the number of HARQ processes linearly to RTT caused by the satellite channel may not be feasible for some UEs due to memory restriction and signaling overhead on the asynchronous HARQ protocol. For example, issues with more than 16 HARQ processes are listed below:

(1) DCI size increase: The DCI is indicated per HARQ process per slot in a 4-bit field in the 3GPP NR specifications. With more than 16 HARQ processes, 10 bits in DCI may be needed to indicate the HARQ process ID for SCS=15 kHz in GEO, and 14 bits with numerology $\mu$=4 (i.e., SCS=120 kHz, by $2\mu*600=24*600=9600$ HARQ processes).

(2) HARQ soft buffer size: HARQ combining of re-transmissions requires soft bits of packets of failed (re)-transmissions to be stored in a soft buffer. In NR, details of the soft buffer dimensioning may be up to UE implementation. Therefore, NW may or may not have soft buffer information at the UE side, especially in a case that there is no HARQ acknowledgement from the UE.

To handle these issues, implementations are provided below for increasing the number of HARQ processes regarding a compromise on moderate increasement of the soft buffer size and potential limitation of scheduling flexibility.

Case 7: HARQ Enhancement

Case 7-1: Increase the Maximum HARQ Number

Case 7-1-1: A New HARQ Process Set Activated/Deactivated MAC CE

A device may be configured with HARQ process sets, each including several HARQ process IDs that can be jointly activated and deactivated by a MAC CE message. The UE is not expected to receive a downlink assignment or uplink grant associated with the deactivated HARQ process IDs. However, an occupied HARQ process ID may not be released by the MAC CE, regardless of the HARQ process being activated or deactivated. The maximum size of each HARQ process set that the NW may use for scheduling grants or assignments may be 16 HARQ processes, but only one HARQ process set may be activated per BWP per serving cell. If a HARQ process set is configured and activated, the field of HARQ process number in a DCI format 1_0 or a DCI format 1_1 may be re-interpreted as indicating the $k^{th}$ value of HARQ process IDs in the activated set, rather than indicating a HARQ process ID in an explicit manner. For example, a HARQ process number in the DCI format 1_0 having a value of 3 may indicate the $3^{rd}$ HARQ process ID in an activated HARQ process set, rather than HARQ process #3.

In some implementations, the UE may receive configured HARQ process sets via dedicated signalling (e.g., Reconfiguration message) or broadcast system information. The network may activate and deactivate the configured HARQ process set of a Serving Cell by sending a HARQ Process Set Activation/Deactivation MAC CE.

Figure 4:
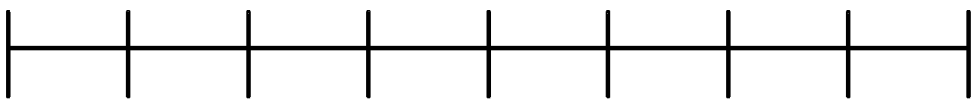
FIG. 4 is a diagram illustrating an example HARQ Process Set Activation/Deactivation MAC CE according to an example implementation of the present disclosure.

FIG. 4 is a diagram 400 illustrating an example HARQ Process Set Activation/Deactivation MAC CE according to an example implementation of the present disclosure. The HARQ Process Set Activation/Deactivation MAC CE may be identified by a MAC sub-header with a specific Logical Channel ID (LCD). In one implementation, the HARQ Process Set Activation/Deactivation MAC CE has a fixed size of 16 bits (including two octets, Oct 1 and Oct 2) with the following fields:

A/D: The field indicates whether to activate or deactivate the indicated HARQ Process Set. For example, the field having a value of 1 indicates activation, the field having a value of 0 indicates deactivation.

Serving Cell ID: The field indicates the identity of the Serving Cell for which the MAC CE applies. The length of the field may be 5 bits.

BWP ID: The field indicates a DL BWP for which the MAC CE applies as the codepoint value of the DCI bandwidth part indicator field. The length of the BWP ID field may be 2 bits.

HARQ Process Set ID: The field contains an index of a higher layer parameter HARQ-Process-SetsToAddModList, indicating the HARQ Process Set to be activated or deactivated. The length of the field may be 4 bits.

R: Reserved bit, which may be set to 0.

In some implementations, the configured HARQ Process Sets may be initially deactivated upon configuration and after a handover. In some implementations, the default state (activation or deactivation) of a configured HAQR Process set for a serving cell may be indicated in RRC signalling. If there is no activated HARQ Process Sets, the UE may consider a default HARQ Process Set is activated that includes the following elements in order: HARQ process number 0, HARQ process number 1, . . . , HARQ process number M, where M is a positive integer configured by higher layer signalling.

Table 8 below lists an example procedure performed by the MAC entity of the UE with respect to the HARQ Process Set Activation/Deactivation MAC CE.

TABLE 8

The MAC entity may:
   1> if the MAC entity receives an HARQ Process Set Activation/Deactivation MAC
      CE on a Serving Cell:
      2> indicate to lower layers the information regarding the HARQ Process Set
         Activation/Deactivation MAC CE.

Figure 5:
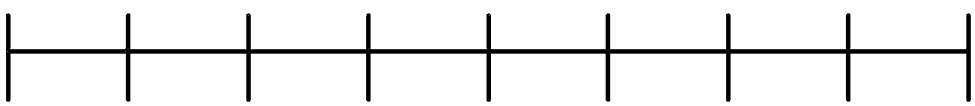
FIG. 5 is a diagram illustrating an example MAC CE that includes a bitmap for the Serving Cell IDs according to an example implementation of the present disclosure.

In one implementation, the fields in the MAC CE illustrated in FIG. 4 may be implemented as a bitmap format that supports multiple activation or deactivation simultaneously. For example, the Serving Cell ID field may be implemented as a bitmap including 32 bits, including $C_1, C_2, \ldots, C_{31}$. FIG. 5 is a diagram 500 illustrating an example MAC CE that includes a bitmap for the Serving Cell IDs according to an example implementation of the present disclosure. Each bit in FIG. 5 may indicate an activation/deactivation state of a specific serving cell. The MAC CE may include four octets: Oct 1, Oct 2, Oct 3, and Oct 4. The MAC CE may include 32 bits: one reserved bit R (which may be set to 0) and 31 bits corresponding to 31 serving cells.

In one implementation, the higher layer parameter HARQ-Process-Set-ToAddModList is used to convey the HARQ process set elements that are to be added to the list or modified in the list.

In one implementation, the higher layer parameter HARQ-Process-Set-ToReleaseList conveys only the set IDs of the list elements that are to be released from the list. In one implementation, this may be the only means to signal modifications to a list maintained in the receiver (typically the UE).

Each HARQ Process set may include a HARQ Process Set ID and the IDs of one or more HARQ process(es). For each HARQ resource set, the number of processes that may be used at most is configured for each cell separately by higher layer parameter nrofHARQ-ProcessesForPDSCH. When there is no higher layer parameter nrofHARQ-ProcessesForPDSCH configured, the UE may assume a default number of 8 processes. In one implementation, within a HARQ resource set, HARQ process IDs are configured by high layer parameters as follows:

HARQ-Process-ID-ToAddModList is used to convey the HARQ process IDs that are to be added to the list or modified in the list.

HARQ-Process-ID-ToReleaseList is used to convey the HARQ process IDs that are to be released from the list.

For a UE configured with the higher layer parameter HARQ-Process-Set-ToAddModList, when the HARQ-ACK corresponding to the PDSCH carrying the activation command for a HARQ process ID is transmitted in slot n, the corresponding action and the UE assumption on TB mapping corresponding to the activated HARQ process ID(s) may be applied starting from the first slot that is after slot n+k', e.g., k'=3.

In one implementation, when a UE detects a PDCCH with a configured DCI format 1_0 or 1_1, the UE may decode the corresponding PDSCHs as indicated by the DCI. The scheduling DCI may include a HARQ process number field (e.g., 4-bit).

If the UE is configured with an activated HARQ process set, the HARQ process number field value may be mapped to a value associated with a HARQ process ID corresponding to a TB provided by HARQ-Process-SetsToAddMod-List. Otherwise, the HARQ process number field value may be mapped to a HARQ process ID explicitly. Table 9 below shows an example mapping between a HARQ process number field and a HARQ process ID when the UE is configured with an activated HARQ process set.

TABLE 9

| HARQ process number field | HARQ process ID |
|---|---|
| 0000 | $1^{st}$ value provided by HARQ-Process-SetsToAddModList |
| 0001 | $2^{nd}$ value provided by HARQ-Process-SetsToAddModList |
| 0010 | $3^{rd}$ value provided by HARQ-Process-SetsToAddModList |
| 0011 | $4^{th}$ value provided by HARQ-Process-SetsToAddlModList |
| 0100 | $5^{th}$ value provided by HARQ-Process-SetsToAddlModList |
| 0101 | $6^{th}$ value provided by HARQ-Process-SetsToAddlModList |

After an activated HARQ process set is deactivated by the HARQ Process Set Activation/Deactivation MAC CE, the UE may maintain the stored downlink assignment and the associated HARQ information for the deactivated HARQ process set, regardless of the MAC CE indication.

In one implementation, the HARQ set activation and deactivation may be associated with a slot number, system frame number (SFN), symbol number, configured by higher layer signalling. In one implementation, the HARQ set activation and deactivation may be associated with a timer, which may be configured by higher layer signalling.

In one implementation, a new HARQ process trigger state list may be introduced. For indicating a HARQ process number ID, new HARQ triggering states are configured using a higher layer parameter HARQ-TriggerStateList. For a HARQ process indication, a single set of HARQ triggering states is higher layer configured, where the triggering states may be associated with any candidate BWP. For example, the set of HARQ triggering states may have three states as HARQ #1, HARQ #6 and HARQ #8.

When the number of configured HARQ triggering states in HARQ-TriggerStateList is greater than K (e.g., K=16), the UE may receive a selection command used to map up to K trigger states to the codepoints of the HARQ process number field in the DCI. The value of K may be configured by a higher layer parameter.

When the HARQ/ACK corresponding to the PDSCH carrying the selection command is transmitted in the slot n, the corresponding action and UE assumption on the mapping of the selected HARQ trigger state to the codepoint of DCI HARQ process number field may be applied starting from slot n+N, where N may indicate the UE processing time.

When the number of HARQ triggering states in HARQ-TriggerStateList is less than or equal to K (e.g., K=16), the HARQ process number field in the DCI may directly indicate the triggering state.

In one implementation, when the number of configured HARQ triggering states in the HARQ-TriggerStateList is greater than K (e.g., K=16), the UE may receive a configuration associated with a slot number, SFN, or a symbol number, used to map up to K trigger states to the codepoints of the HARQ process number field in the DCI.

Case 7-1-2: Extend the Field of HARQ Process Number in DCI

DCI format 1_1 may be used for scheduling a PDSCH in one cell. The DCI format 1_1 may support up to 14 bits for the HARQ process number field, if some information fields are not present in the DCI. Since the size of the DCI format 1_1 depends on the features that are configured in the system, some information fields may or may not be present. For example, if carrier aggregation is not configured, there is no need to include carrier-aggregation-related information in the DCI. With this consideration, the extended bits may be beneficial to align with the size of the uplink DCI format 0_1 to reduce the number of blinding decodes.

The following information is transmitted by means of the DCI format 1_1 with CRC scrambled by C-RNTI or CS-RNTI or MCS-C-RNTI or a new NTN-RNTI:

HARQ process number—4, 5, 6, 7, 8, 9, 10, 11, 12, 13, or 14 bits. The bit-width for this field may be determined as $\lceil \log 2(I) \rceil$ bits, where I is the number provided by a new higher layer parameter NTN-nrofHARQ-ProcessesForPDSCH or provided by the higher layer parameter nrofHARQ-ProcessesForPDSCH if configured; otherwise I is equal to 8 as the default DL HARQ process number.

For UL, DCI format 0_1 is used for scheduling a PUSCH in one cell. The following information may be transmitted by means of the DCI format 0_1 with CRC scrambled by C-RNTI or CS-RNTI or SP-CSI-RNTI or MCS-C-RNTI or a new NTN-RNTI:

HARQ process number—4, 5, 6, 7, 8, 9, 10, 11, 12, 13, or 14 bits. The bit-width for this field may be determined as $\lceil \log 2(I) \rceil$ bits, where I is the number provided by a new higher layer parameter NTN-nrofHARQ-ProcessesForPUSCH; otherwise I is equal to 16 as the default UL HARQ process number.

In one implementation, a new field of HARQ process number may be added in the DCI. The following information may be transmitted by means of the DCI format 1_1 with CRC scrambled by C-RNTI or CS-RNTI or MCS-C-RNTI or a new NTN-RNTI:

Additional HARQ process number for NTN—0, 1, 2, 3, 4, 5, 6, 7, 8, 9, 10, 11, 12, 13, or 14 bits. The bit-width for this field may be determined as $\lceil \log 2(I) \rceil$ bits, where I is the number provided by a new higher layer parameter NTN-nrofHARQ-ProcessesForPDSCH if configured; otherwise I is equal to 0 as the default DL NTN HARQ process number. The operator $\lceil \ \rceil$ is a ceiling function.

The following information may be transmitted by means of the DCI format 0_1 with CRC scrambled by C-RNTI or CS-RNTI or SP-CSI-RNTI or MCS-C-RNTI or a new NTN-RNTI:

Additional HARQ process number for NTN—0, 1, 2, 3, 4, 5, 6, 7, 8, 9, 10, 11, 12, 13, or 14 bits. The bit-width for this field is determined as $\lceil \log 2(I) \rceil$ bits, where I is the number provided by a new higher layer parameter NTN-nrofHARQ-ProcessesForPUSCH if configured; otherwise I is equal to 0 as the default UL HARQ process number.

The codepoints of the HARQ process number for NTN field in DCIs map to a new NTN HARQ process, which may be maintained by a HARQ entity for each Serving Cell. For example, the MAC entity includes a HARQ entity for each Serving Cell, which maintains a number of parallel HARQ processes, including the new NTN HARQ processes. Each HARQ process is associated with a HARQ process identifier or with a new NTN-HARQ process identifier. The HARQ entity directs HARQ information and associated TBs received on the DL-SCH to the corresponding HARQ processes.

In one implementation, the codepoints of the HARQ process number for NTN field in DCIs map to a new NTN HARQ process, which may be maintained by a second HARQ entity for each Serving Cell. For example, the MAC entity includes two HARQ entities for each Serving Cell. The first HARQ entity maintains a number of parallel HARQ processes, and the second HARQ entity maintains the new NTN HARQ processes. Each HARQ process is associated with a HARQ process identifier. Each NTN HARQ process is associated with an NTN HARQ process identifier. The HARQ entity directs HARQ information and associated TBs received on the DL-SCH to the corresponding HARQ processes.

Case 7-1-3: Associate the HARQ Process Number Field with the DL Slot Numbers

In one implementation, a HARQ process ID may be indicated by involving DCI of a scheduling assignment and a slot number. The slot number may be derived from SFN, the number of slots per frame, the sub-slot number, and the symbol number. By this means, a device may be indicated by the same HARQ process a number for contiguous slots by receiving multiple DCI formats of scheduling assignments. Depending on the slot where the scheduled transmission is, the device may differentiate these HARQ processes.

For DL assignments or UL grants, if the value of nrof-HARQ-Processes is greater than 16, the HARQ Process ID associated with the slot where the DL transmission starts may be derived from the following equation:

$$HARQ\ ID = HARQ\_idx + idx\_max * [[CURRENT\_slot] modulo [nrofHARQ-Processes/idx\_max]]$$

HARQ_idx refers to a HARQ process number field value of the scheduling DCI of the dynamic downlink assignment. idx_max refers to the maximum HARQ process number indicated by the scheduling DCI, e.g., 16. CURRENT_slot= [(SFN×numberOfSlotsPerFrame)+slot number in the frame]. numberOfSlotsPerFrame refers to the number of consecutive slots per frame.

For example, if a UE receives a HARQ process number field indicator via a dynamic DCI that indicates following values: HARQ_idx=1, nrofHARQ-Processes=32, and idx_max=16, the corresponding HARQ process ID is derived based on the described equation above as follows:
  HARQ ID=1, if the value of CURRENT_slot is an odd number;
  HARQ ID=17, if the value of CURRENT_slot is an even number.

Case 7-1-4: Reuse DCI Fields and Provide Different Interpretation

In one implementation, a new NTN-RNTI may be introduced for a new field definition. All fields may be reset and the HARQ related filed may be extended. The HARQ process ID may be indicated by means of the DCI format 1_0 or DCI format 0_0 with CRC scrambled by the new NTN-RNTI.

DCI format 0_0 is used for scheduling a PUSCH in one cell. The following information is transmitted by means of the DCI format 0_0 with CRC scrambled by the new NTN-RNTI:
  HARQ process number—k bit(s), where k may be 0, 1, 2, . . . , 14.
  HARQ ACK disabling indicator—1 bit, where the value 1 refers to HARQ-ACK-less operation.

DCI format 1_0 is used for scheduling a PDSCH in one cell. The following information is transmitted by means of the DCI format 1_0 with CRC scrambled by the new NTN-RNTI:
  HARQ process number—k bit(s), where k may be 0, 1, 2, . . . , 14.
  HARQ ACK disabling indicator—1 bit, where the value 1 refers to HARQ-ACK-less operation.
  PDSCH-to-HARQ_feedback timing indicator—3 bits. If HARQ-ACK is disabled, this field is reserved.

In one implementation, codepoints in the DCI may be used.

DCI format 1_0 is used for scheduling a PDSCH in one cell. If the CRC of the DCI format 1_0 is scrambled by C-RNTI or CS-RNTI or MCS-C-RNTI or NTN-RNTI and codepoints of one or multiple fields meet a pre-determined condition (e.g., the "Frequency domain resource assignment" field having all its bits as ones), the DCI format 1_0 is for enhanced HARQ process number indication, with all remaining fields set as follows:
  HARQ process number—4, 5, 6, 7, 8, 9, 10, 11, 12, 13, or 14 bits. The bit-width for this field is determined as $\lceil \log 2(I) \rceil$ bits, where I is the number provided by a new higher layer parameter NTN-nrofHARQ-ProcessesForPDSCH or provided by the higher layer parameter nrofHARQ-ProcessesForPDSCH if configured; otherwise I is equal to 8 as the default DL HARQ process number.
  Note that this alternative may be associated with higher layer parameters for the UE to identify NTN scenarios.

In one implementation, DCI Format 1_0 may be reused when an NTN scenario is detected. For example, Cell ID is detected as an ID for Satellite service or NTN-RNTI is configured in RRC signalling. The following information is transmitted by means of the DCI format 1_0 with CRC scrambled by C-RNTI or CS-RNTI or MCS-C-RNTI:
  Downlink assignment index (DAI, 2 bits). The field may be only present in the case of a dynamic HARQ codebook. The field may be reinterpreted for HARQ process ID indication when the dynamic HARQ codebook is not configured. If the higher parameter physicalCellGroupConfig is not configured or the higher parameter pdsch-HARQ-ACK-Codebook is set to "Semi Static", this bit field is reserved. The reserved bits may be reused by other fields.
  PDSCH-to-HARQ feedback timing indicator (3 bits). The field may provide information on when the HARQ feedback is transmitted relative to the reception of the PDSCH. The field may be reinterpreted for HARQ process ID indication if the HARQ feedback is disabled or the higher layer parameter dl-DataToUL-ACK is configured to provide feedback timing that is not in a range of 1 to 8.

Transmit Power Control (TPC) command for scheduled PUCCH (2 bits). The field may be used to adjust the PUCCH transmission power. The field may be reused for HARQ process ID indication if some criteria are met (e.g., the higher layer parameters PUCCH-SpatialRelationInfo is not configured). The field may be reserved if the higher layer parameters PUCCH-SpatialRelationInfo is not configured.

HARQ process number—4, 5, 6, 7, 8, 9, 10, 11, 12, 13, or 14 bits. The length of the field depends on how many reserved bits are left in the DCI format 1_0.

Extended HARQ indicator—1 bit. If the value of the field is set to 1, the field indicates the HARQ process number field is extended to more than 4 bits by carrying all the reserved bits.

Note that this alternative may be associated with higher layer parameters for UE to identify NTN scenarios.

In one implementation, Slot Format Indication in DCI Format 2_0 may be reused when an NTN scenario is detected.

DCI format 2_0 is used for notifying the slot format to support dynamic TDD. Since NTN may only support FDD operation, there may be a need to reuse the DCI for another purpose, e.g., a HARQ process number indication or a HARQ feedback disabling. The size of the DCI format may be configurable by higher layers up to 128 bits. These bits may be reinterpreted when a certain condition has been triggered.

DCI format 2_0 is used for notifying the slot format. If the high layer parameter positionInDCI is not configured, and if a new high layer parameter HARQ-DCI-reuse is set to enabled, the following information is transmitted by means of the DCI format 2_0 with CRC scrambled by SFI-RNTI: HARQ process number 1, HARQ process number 2, . . . , HARQ process number N.

The size of DCI format 2_0 may be configurable by higher layers up to 128 bits. Note that this alternative may be associated with higher layer parameters for the UE to identify NTN scenarios.

In one implementation, a new DCI format 2_4 may be introduced.

The DCI format 2_4 may be used for the transmission of HARQ process number for PDSCH and PUSCH. The following information is transmitted by means of the DCI format 2_4 with CRC scrambled by a new NTN-HARQ-RNTI or a new NTN-RNTI:

HARQ process number—4, 5, 6, 7, 8, 9, 10, 11, 12, 13, or 14 bits. The bit-width for this field is determined as $\lceil \log 2(I) \rceil$ bits, where I is the number provided by a new higher layer parameter NTN-nrofHARQ-ProcessesForPDSCH if configured, or provided by the higher layer parameter nrofHARQ-ProcessesForPDSCH if configured; otherwise I is equal to 8 as the default DL HARQ process number.

The number of information bits in the DCI format 2_4 may be less than or equal to the payload size of the DCI format 0_0 monitored in a common search space in the same serving cell. If the number of information bits in the DCI format 2_4 is less than the payload size of the DCI format 0_0 monitored in the common search space in the same serving cell, zeros may be appended to the DCI format 2_4 until the payload size equals that of the DCI format 0_0 monitored in the common search space in the same serving cell.

The HARQ related information message may be directed to a group of devices using an RNTI specific to that group and each device may be configured with the HARQ process number bits in a joint message. For example, HARQ process number 1, HARQ process number 2, . . . , HARQ process number N, where each HARQ process number is for one UE per BWP per serving cell.

Case 7-1-5: Associate with Search Space ID and Control Resource Set (CORESET) ID In NR, the network configures at most 10 Search Spaces per BWP per cell (including UE-specific and common Search Spaces), and at most 3 CORESETs per BWP per cell (including UE-specific and common CORESETs). Therefore, the HARQ process ID may be associated with the search spaces and CORESETs configured to a device. For example, if the HARQ related information is transmitted on a PDCCH, where the search space ID (up to 40) and the CORESET ID (up to 12) configured on the PDCCH may be used for HARQ process ID indication.

For each Serving Cell and each configured downlink assignment, if configured and activated, and if the PDSCH duration of the configured downlink assignment does not overlap with the PDSCH duration of a downlink assignment received on the PDCCH for this Serving Cell the MAC entity may perform the following operations:

instruct the physical layer to receive, in this PDSCH duration, a transport block on the DL-SCH according to the configured downlink assignment and to deliver it to the HARQ entity;

set the HARQ Process ID to the HARQ Process ID associated with this PDSCH duration based on the following equation: HARQ ID=f($SS_{ID}$, $CORESET_{ID}$, $HARQ_{IDX}$), where f(•) denotes a function with these input parameters as search space ID ($SS_{ID}$), CORESET ID ($CORESET_{ID}$) and HARQ process number ID in the DCI format 0_0 or the DCI format 0_1 ($HARQ_{IDX}$).

For example, HARQ ID=f($SS_{ID}$, $CORESET_{ID}$, $HARQ_{IDX}$)=40×$SS_{ID}$+12×$CORESET_{ID}$+$HARQ_{IDX}$. HARQ ID=f(3, 2, 1)=145.

The HARQ process ID of a PDSCH may be associated with a slot number of a CORESET, or a monitored search space that provides the scheduling DCI information associated with the scheduled PDSCH.

Note that this alternative may be associated with higher layer parameters for the UE to identify NTN scenarios.

Case 7-2: HARQ-ID-Less Operation for Semi-Persistent Scheduling (SPS)

Case 7-2-1: The Fixed Slot Offset K0

The value K0 may indicate the slot offset between a DCI format and its scheduled PDSCH. For SPS, a HARQ ID of a scheduled PDSCH may be inferred from the transmission time, e.g., SFN and a slot number. This ID may only be used for SPS retransmission and potential ID collision due to other dynamic scheduling. Therefore, if the slot offset K0 is fixed and known between a device and a base station, a HARQ ID carried by a DCI format may be associated with its scheduled PDSCH, calculated from its transmission time. By this mean, there is no need to explicitly indicate the HARQ process ID in the DCI field.

For configured downlink assignments, the HARQ Process ID associated with the slot where the DL transmission starts is derived from the following equation:

$$HARQ\ Process\ ID = [\text{floor}(CURRENT\_slot \times 10 / (numberOfSlotsPerFrame \times periodicity))]$$
$$modulo\ nrofHARQ-Processes$$

where CURRENT_slot=[(SFN×numberOfSlotsPerFrame)+slot number in the frame], numberOfSlotsPerFrame refers to the number of consecutive slots per frame. In the above equation, floor(x) denotes the floor function, which takes as input a real number and gives as output the greatest integer less than or equal to the input. Periodicity is configured by higher layer signalling.

If a new higher layer HARQ-ID-less-indicator is set to enabled and the slot offset is configured by a higher layer parameter K0, the HARQ Process ID associated with the scheduling DCI may be derived from the slot of the scheduled PDSCH transmission.

The scheduling DCI may be always located in a slot having the slot offset K0 before the slot in which the scheduled PDSCH is located.

As a result, since the HARQ process number ID for the scheduling DCI may be calculated by UE, there is no need for any signaling by the DCI field for HARQ process number ID.

For configured uplink grants, the HARQ Process ID associated with the first symbol of a UL transmission may be derived from the following equation:

$$HARQ\ Process\ ID = [\text{floor}(CURRENT\_symbol / periodicity)]$$
$$modulo\ nrofHARQ-Processes$$

where CURRENT_symbol=(SFN×numberOfSlotsPerFrame×numberOfSymbolsPerSlot+slot number in the frame×numberOfSymbolsPerSlot+symbol number in the slot), and numberOfSlotsPerFrame and numberOfSymbolsPerSlot refer to the number of consecutive slots per frame and the number of consecutive symbols per slot, respectively. Periodicity is configured by higher layer signaling.

If a new higher layer HARQ-ID-less-indicator is set to enabled and the slot offset is configured by a higher layer parameter K2, the HARQ Process ID associated with the scheduling DCI may be derived from the slot of the granted PUSCH transmission.

The scheduling DCI may be always located in a slot having the slot offset K2 before the slot in which the scheduled PUSCH is located.

As a result, since the HARQ process number ID for the scheduling DCI may be calculated by UE, there is no need for any signaling by the DCI field for HARQ process number ID.

Case 8: Rate Matching (RM) and Soft Buffer Management
Case 8-1: Dynamic Limited Buffer Rate Matching (LBRM)
Case 8-1-1: A New and Smaller RM Buffer Size for LBRM In NR, the maximum size of a rate matching buffer is inferred by a reference transport block size (TBS) named TBSLBRM, which is associated with the maximum modulation for the serving cell and the maximum coding rate. For NTN, those MCS assumptions may be unrealistic due to the limited link budget. Therefore, a new buffer size may be introduced based on a moderate MCS assumption, configured via an RRC message or indicated by a DCI field.

The rate matching for LDPC code may be defined per coded block and may include bit selection and bit interleaving. For bit selection, the input bit sequence to rate matching is $d_0, d_1, \ldots, d_{N-1}$, written into a circular buffer of length $N_{cb}$ for the r-th coded block.

For the r-th code block, let
$N_{cb}$=N, if the higher layer parameter rateMatching is set to "disabled". (no limitation)
$N_{cb}$=the minimum of N and $N_{ref}$, if rateMatching is set to "enabled", where
$N_{ref}$ is specified in TS. 38.212. (limitation by setting a threshold)
$N_{cb}$=the minimum of N and $N_{limit}$, if rateMatching is set to "limited", where $N_{limit}$ is smaller than $N_{ref}$, derived from the following parameters: the number of layers for one TB for UL-SCH, the number of layers for one TB for DL-SCH/PCH, moderate modulation order (e.g., modulation order Qm=4), moderate coding rate (e.g., target code rate R×[1024]=340), the number of PRBs, and the number of code blocks of the transport block.

Case 8-1-2: A Dynamic RM Buffer Size for LBRM

Buffer size may be dynamically changed based on the current TB size instead of the reference TBS. This may provide benefits on small TBS transmission because all TBs no matter what its sizes are may have a limitation on soft buffer usage. In NR, only large TBs have such limitation.

The rate matching for LDPC code may be defined per coded block and may include bit selection and bit interleaving. For bit selection, the input bit sequence to rate matching is $d_0, d_1, \ldots, d_{N-1}$, written into a circular buffer of length $N_{cb}$ for the r-th coded block.

For NTN scenarios (the UE detects, or receives higher layer signaling), the UE is not expected to set more than one coded block per TB.

For the r-th code block, let
$N_{cb}$=N, if the higher layer parameter rateMatching is set to "disabled". (no limitation)
$N_{cb}$=the minimum of N and $N_{ref}$, if rateMatching is set to "enabled". (by a threshold)

$$N_{cb} = \left\lfloor \frac{TBS\_N}{C \times R_{LBRM}} \right\rfloor,$$

if rateMatching is set to "dynamic", where $R_{LBRM}$=2/3, the new parameter TB S N refers to the transport block size associated with the input code block, the parameter C refers to the total number of code block blocks for the transport block, and l refers to the floor function.

In one implementation, the UE may perform capability report to indicate whether the supports the dynamic RM buffer limitation, specifically, to indicate whether the feature has been implemented and successfully tested. For the capability report, there may be UE radio access capability parameters, including a new parameter dynamic-RAI-buffer-limitation, which indicates whether the UE supports the overbooking procedure, used for giving priority to store bits in the soft buffer corresponding to some specified rules.

Case 8-2: Introduce a Reference Soft Buffer Size and Allow Overbooking

Case 8-2-1: Define a Soft Buffer Size

In NR, soft buffer dimensioning is up to UE implementation, so there is no soft buffer management and related overbooking behavior in the current specifications. In NTN, to avoid possible soft buffer overflow caused by increasing HARQ processes, there is a need to introduce a new reference soft buffer size and bit dropping rules if overbooking is allowed. The soft buffer size per HARQ may be determined by the maximum bits per slot on a reference channel for implementation testing, specified in TS 38.101, e.g., 233280 bits for FDD, SCS 15 kHz, and 256 QAM. This reference size may be used for triggering overbooking procedures in a device and a base station. There may be one or more reference soft buffer sizes and the UE may need to report one of the reference soft buffer sizes, based on UE processing capabilities.

The reference buffer size may be determined by coupling with the RM buffer or referred to a testing case.

The maximum $N_{ref}$ specified in TS 38.212 where the input parameters, such as multiple-input multiple-output (MIMO) layers, modulation order, coding rate, and frequency band, are chosen based on a UE capability report.

The maximum bit payload per slot specified in TS. 38.101, where the input parameters, such as SPS, modulation, TDD, and FDD operation, are chosen based on a UE capability report.

Once the reference buffer size is determined, UE may have overbooking procedures when NW schedules more bits than the reference buffer size.

Case 8-2-2: Specify Priority on Dropping Rules

Bit dropping may be performed in a device when HARQ overbooking is allowed. A device may be configured with more HARQ processes than the soft buffer capacity. The device may give priority to store bits corresponding to lower time index on channel coding bits in a first-come-first-store principle.

If the soft buffer has an overflow or to avoid possible overflow, the overbooking procedure is performed by the UE that drops additional bits or gives priority to certain bits if some conditions are met.

The UE may give priority to store bits corresponding to
  lower time index, i.e., to fit the first come first serve principle
  lower HARQ process ID
  UL than DL
  Dynamic than Repetition or Retransmission
  Dynamic than SPS or Configured Grant transmission
  HARQ feedback transmission than HARQ feedback less transmission The UE may report soft buffer status when an overflow happens. NW may indicate a new high layer parameter soft-buffer-overbooking for enabling the overbooking procedure.

In one implementation, the UE may perform a capability report to indicate whether the UE supports the overbooking procedure, specifically, to indicate whether the feature has been implemented and successfully tested. For the capability report, there may be UE radio access capability parameters, including a new parameter soft-buffer-overbooking, which indicates whether the UE supports the overbooking procedure, used for giving priority to store bits in the soft buffer corresponding to some specified rules.

Case 9: Disabling HARQ Feedback

In one implementation, multiple transmissions of the same TB (e.g., the MAC entity schedules the same TB on the same HARQ process without the NDI being toggled) are possible and might be useful to lower the residual BLER, particularly in case HARQ feedback is disabled.

In one implementation, for DL, the re-transmission assignment may be scheduled after the HARQ feedback (also referred to as UL HARQ feedback).

In one implementation, the UE is not expected to receive another PDSCH for a given HARQ process until after the end of the expected transmission of HARQ-ACK for that HARQ process.

Minor changes on the UE procedure may be needed for the DL transmission.

In one implementation, the UE is not expected to receive another PDSCH for a given HARQ process (new HARQ process #1) until after the end of the expected transmission of HARQ-ACK for that HARQ process (old HARQ process #1), except when at least one of the following conditions is met:

That HARQ process (old HARQ process #1) is configured
  by higher layer signaling (e.g., MAC CE or RRC) or L1
  indication (e.g., DCIs) with disabling HARQ feedback
  (e.g., disabling UL HARQ feedback for the DL transmission). In one implementation, disabling HARQ
  feedback may include at least one of the following
  operations: not sending ACK, not sending NACK, or
  not sending ACK or NACK feedback.

The UE is configured by higher layer signaling or L1
  indication with all HARQ feedback disabling.

The associated Serving Cell is configured by higher layer
  signaling or L1 indication with disabling HARQ feedback.

The associated Logical Channel is configured by higher
  layer signaling or L1 indication with disabling HARQ
  feedback.

The given HARQ process (new HARQ process #1) is
  carried by a DCI format scrambled by a new RNTI
  (e.g., NTN-RNTI) or carried by a DCI format having a
  new indicator to achieve HARQ-less retransmission.
  For example, the new indicator may be a new HARQ-
  less field (e.g., 1 bit) in the DCI for indicating whether
  this scheduling assignment is for retransmission of the
  same TB associated with that HARQ process (old
  HARQ process #1).

Figure 6:
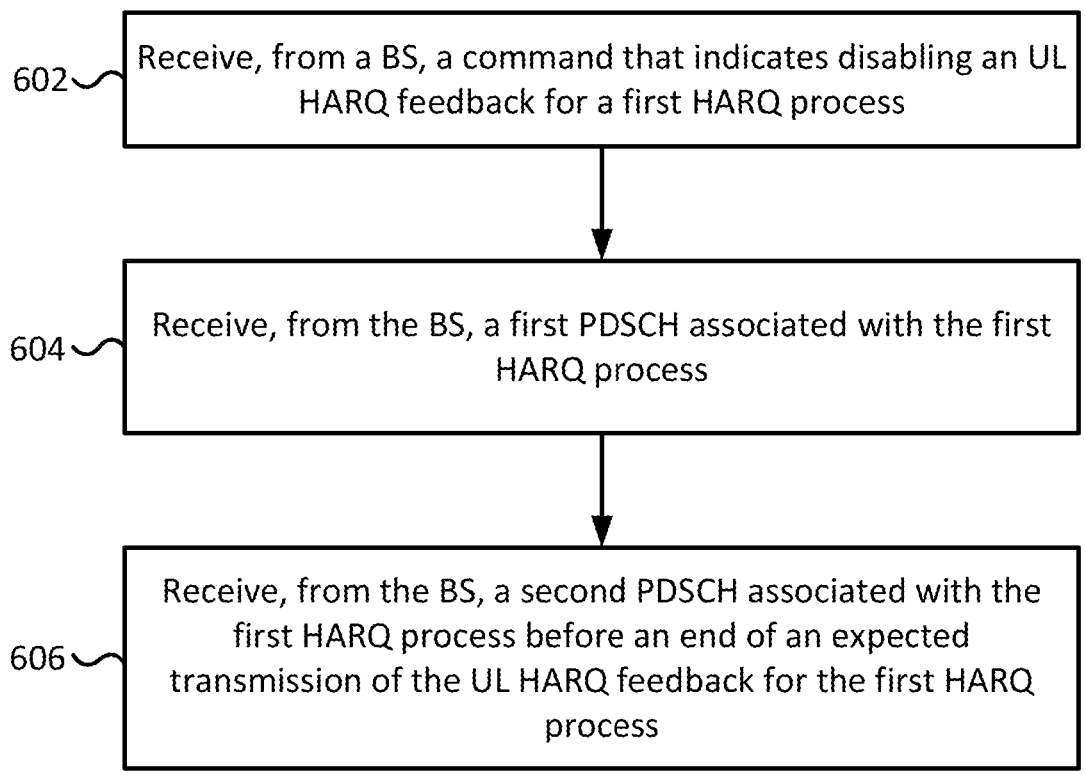
FIG. 6 is a flowchart of a method performed by a UE for handling DL transmission according to an example implementation of the present disclosure

FIG. 6 is a flowchart of a method 600 performed by a UE for handling DL transmission according to an example implementation of the present disclosure. In action 602, the UE may receive, from a BS, a command that indicates disabling an UL HARQ feedback for a first HARQ process. In one implementation, the command is received via an RRC message. In one implementation, the RRC message may include an ID of the first HARQ process. For example, the command may indicate disabling UL HARQ feedback for a specific HARQ process. In one implementation, the RRC message may indicate disabling all UL HARQ feedbacks for the UE. In this implementation there may be no HARQ process ID in the command.

In one implementation, the command may be received via a DCI format, where CRC bits of the DCI format may be scrambled by an RNTI that is specific to an NTN scenario (e.g., the NTN-RNTI).

In action 604, the UE may receive, from the BS, a first PDSCH associated with the first HARQ process. In one implementation, the command in action 602 may be received via a DCI format that schedules the first PDSCH in action 604.

In one implementation, the command in action 602 may be received via a DCI format, and the DCI format includes a field for indicating a retransmission of a TB (e.g., a TB transmitted in the first PDSCH in action 604).

In action 606, the UE may receive, from the BS, a second PDSCH associated with the first HARQ process before an end of an expected transmission of the UL HARQ feedback for the first HARQ process. In one implementation, the second PDSCH includes a retransmission of a TB transmitted in the first PDSCH.

In one implementation, the first PDSCH in action 604 is scheduled by a first DCI format that includes the first HARQ process ID and a first NDI field. The second PDSCH in action 606 is scheduled by a second DCI format that includes the first HARQ process ID (same as that in the first DCI format) and a second NDI field having the same value as the first NDI field (non-toggled NDI may indicate a retransmission of a TB).

Figure 7:
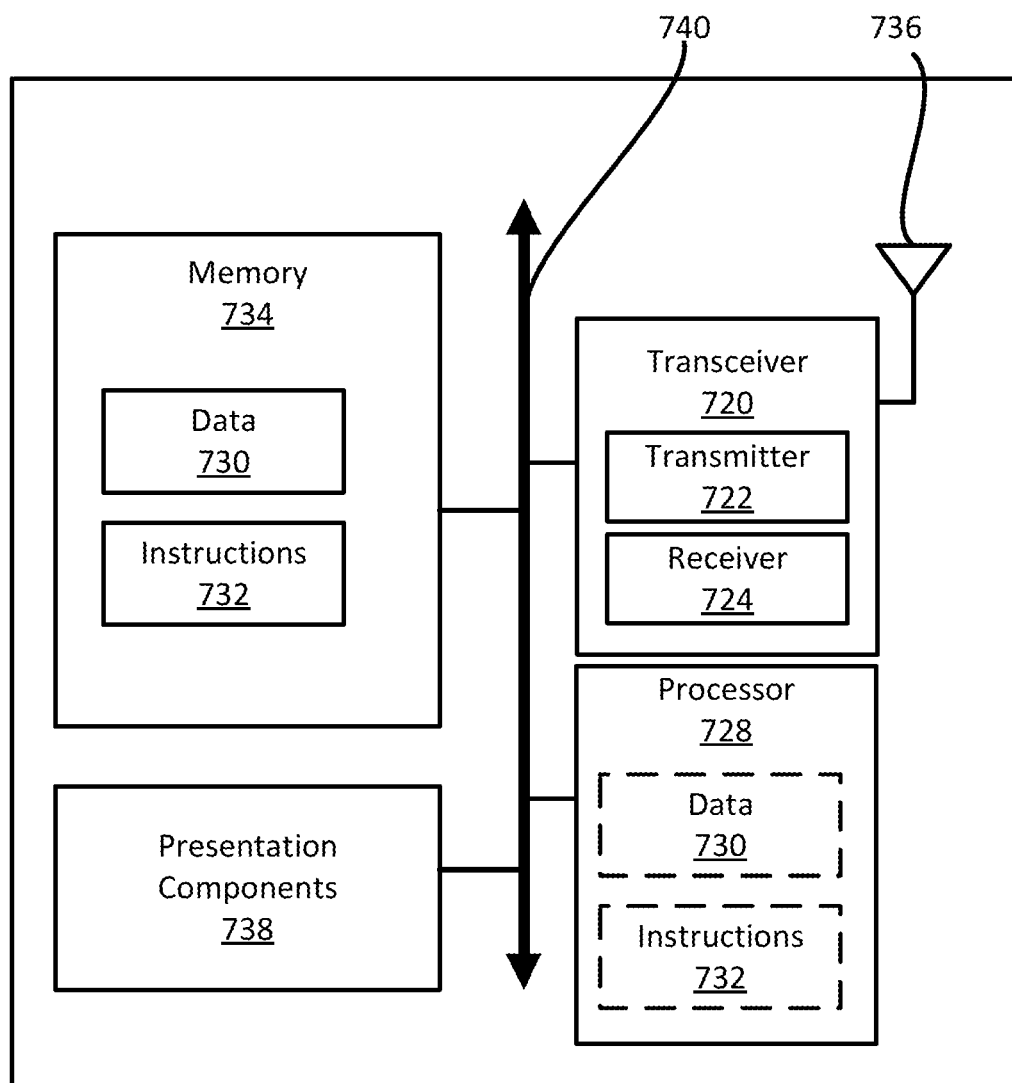
FIG. 7 is a block diagram illustrating a node for wireless communication in accordance with various aspects of the present disclosure.

FIG. 7 is a block diagram illustrating a node 700 for wireless communication according to the present disclosure. As illustrated in FIG. 7, the node 700 may include a transceiver 720, a processor 728, a memory 734, one or more presentation components 738, and at least one antenna 736. The node 700 may also include an RF spectrum band module, a BS communications module, a network communications module, and a system communications management module, Input/Output (I/O) ports, I/O components, and a power supply (not shown).

Each of the components may directly or indirectly communicate with each other over one or more buses 740. The node 700 may be a UE or a BS that performs various functions disclosed with reference to FIGS. 1 through 6.

The transceiver 720 has a transmitter 722 (e.g., transmitting/transmission circuitry) and a receiver 724 (e.g., receiving/reception circuitry) and may be configured to transmit and/or receive time and/or frequency resource partitioning information. The transceiver 720 may be configured to transmit in different types of subframes and slots including but not limited to usable, non-usable and flexibly usable subframes and slot formats. The transceiver 720 may be configured to receive data and control channels.

The node 700 may include a variety of computer-readable media. Computer-readable media may be any available media that may be accessed by the node 700 and include both volatile and non-volatile media, removable and non-removable media.

The computer-readable media may include computer storage media and communication media. Computer storage media include both volatile and non-volatile, removable and non-removable media implemented in any method or technology for storage of information such as computer-readable instructions, data structures, program modules or data.

Computer storage media include RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media do not include a propagated data signal. Communication media typically embody computer-readable instructions, data structures, program modules or other data in a modulated data signal such as a carrier wave or other transport mechanism and include any information delivery media.

The term "modulated data signal" means a signal that has one or more of its characteristics set or changed in such a manner as to encode information in the signal. Communication media include wired media such as a wired network or direct-wired connection, and wireless media such as acoustic, RF, infrared and other wireless media. Combinations of any of the previously listed components should also be included within the scope of computer-readable media.

The memory 734 may include computer-storage media in the form of volatile and/or non-volatile memory. The memory 734 may be removable, non-removable, or a combination thereof.

Example memory includes solid-state memory, hard drives, optical-disc drives, etc. As illustrated in FIG. 7, the memory 734 may store computer-readable, computer-executable instructions 732 (e.g., software codes) that are configured to cause the processor 728 to perform various disclosed functions with reference to FIGS. 1 through 6. Alternatively, the instructions 732 may not be directly executable by the processor 728 but be configured to cause the node 700 (e.g., when compiled and executed) to perform various functions disclosed herein.

The processor 728 (e.g., having processing circuitry) may include an intelligent hardware device, e.g., a Central Processing Unit (CPU), a microcontroller, an ASIC, etc. The processor 728 may include memory.

The processor 728 may process the data 730 and the instructions 732 received from the memory 734, and information transmitted and received via the transceiver 720, the base band communications module, and/or the network communications module. The processor 728 may also process information to be sent to the transceiver 720 for transmission via the antenna 736 to the network communications module for transmission to a core network.

One or more presentation components 738 present data to a person or another device. Examples of presentation components 738 include a display device, a speaker, a printing component, and a vibrating component.

In view of the present disclosure, it is obvious that various techniques may be used for implementing the concepts in the present disclosure without departing from the scope of those concepts. Moreover, while the concepts have been disclosed with specific reference to certain implementations, a person of ordinary skill in the art may recognize that changes may be made in form and detail without departing from the scope of those concepts.

As such, the described implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A user equipment (UE) comprising:
   at least one processor; and
   at least one non-transitory computer-readable medium storing one or more instructions that, when executed by the at least one processor, cause the UE to:
   receive a radio resource control (RRC) configuration from a base station (BS);
   determine whether a first parameter is configured in the RRC configuration;
   receive, from the BS, a command that indicates disabling a Hybrid Automatic Repeat Request (HARQ) feedback for a specific HARQ process;
   receive first downlink control information (DCI) from the BS, the first DCI including a first field indicating a first HARQ process identifier (ID);
   determine that a number of bits in the first field is a default number in a case that the first parameter is not configured in the RRC configuration;

determine that the number of bits in the first field is a specific number greater than the default number in a case that the first parameter is configured in the RRC configuration;

receive, from the BS, a first Physical Downlink Shared Channel (PDSCH) associated with the specific HARQ process; and receive, from the BS, a second PDSCH associated with the specific HARQ process before an end of an expected transmission of the HARQ feedback for the specific HARQ process, the second PDSCH including a retransmission of a Transport Block (TB) transmitted in the first PDSCH.

2. The UE of claim 1, wherein the command is received via an RRC message.

3. The UE of claim 2, wherein the RRC message indicates an ID of the specific HARQ process.

4. The UE of claim 1, wherein the one or more instructions, when executed by the at least one processor, further cause the UE to:

receive, from the BS, a Channel State Information (CSI) report configuration that includes a second parameter for indicating a polarization mode.

5. The UE of claim 4, wherein the one or more instructions, when executed by the at least one processor, further cause the UE to:

determine a Channel Quality Indicator (CQI) based on the CSI report configuration, wherein the CQI has different values depending on a value of the second parameter.

6. The UE of claim 1, wherein the specific number is 5.

7. The UE of claim 1, wherein the first DCI comprises one of a DCI format 0_1 and a DCI format 1_1.

8. The UE of claim 1, wherein:

the first DCI comprises a DCI format 0_1; and the one or more instructions, when executed by the at least one processor, further cause the UE to:

determine whether a second parameter is configured in the RRC configuration;

receive second DCI having a DCI format 1_1 from the BS, the second DCI including a second field indicating a second HARQ process ID;

determine that a number of bits in the second field is the default number in a case that the second parameter is not configured in the RRC configuration; and determine that the number of bits in the second field is the specific number in a case that the second parameter is configured in the RRC configuration.

9. A method for wireless communication performed by a user equipment (UE), the method comprising:

receiving a radio resource control (RRC) configuration from a base station (BS);

determining whether a first parameter is configured in the RRC configuration;

receiving, from the BS, a command that indicates disabling a Hybrid Automatic Repeat Request (HARQ) feedback for a specific HARQ process;

receiving first downlink control information (DCI) from the BS, the first DCI including a first field indicating a first HARQ process identifier (ID);

determining that a number of bits in the first field is a default number in a case that the first parameter is not configured in the RRC configuration;

determining that the number of bits in the first field is a specific number greater than the default number in a case that the first parameter is configured in the RRC configuration;

receiving, from the BS, a first Physical Downlink Shared Channel (PDSCH) associated with the specific HARQ process; and receiving, from the BS, a second PDSCH associated with the specific HARQ process before an end of an expected transmission of the HARQ feedback for the specific HARQ process, the second PDSCH including a retransmission of a Transport Block (TB) transmitted in the first PDSCH.

10. The method of claim 9, wherein the command is received via an RRC message.

11. The method of claim 10, wherein the RRC message indicates an ID of the specific HARQ process.

12. The method of claim 9, further comprising:

receiving, from the BS, a Channel State Information (CSI) report configuration that includes a second parameter for indicating a polarization mode.

13. The method of claim 12, further comprising:

determining a Channel Quality Indicator (CQI) based on the CSI report configuration, wherein the CQI has different values depending on a value of the second parameter.

14. The method of claim 9, wherein the specific number is 5.

15. The method of claim 9, wherein the first DCI comprises one of a DCI format 0_1 and a DCI format 1_1.

16. The method of claim 9, wherein:

the first DCI comprises a DCI format 0_1; and the method further comprises:

determining whether a second parameter is configured in the RRC configuration;

receiving second DCI having a DCI format 1_1 from the BS, the second DCI including a second field indicating a second HARQ process ID;

determining that a number of bits in the second field is the default number in a case that the second parameter is not configured in the RRC configuration; and determining that the number of bits in the second field is the specific number in a case that the second parameter is configured in the RRC configuration.

* * * * *